(12) United States Patent
Yoshida

(10) Patent No.: US 10,592,182 B2
(45) Date of Patent: Mar. 17, 2020

(54) ALLOWING TERMINAL DEVICES TO DETERMINE POSITIONS OF ELECTRONIC APPARATUS

(71) Applicant: SEIKO EPSON CORPORATION, Tokyo (JP)

(72) Inventor: Yutaka Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/168,638

(22) Filed: Oct. 23, 2018

(65) Prior Publication Data

US 2019/0121589 A1 Apr. 25, 2019

(30) Foreign Application Priority Data

Oct. 24, 2017 (JP) .................. 2017-204896

(51) Int. Cl.
*G06F 3/12* (2006.01)
*H04N 1/00* (2006.01)
*G06F 21/31* (2013.01)
*G06F 21/44* (2013.01)

(52) U.S. Cl.
CPC .......... *G06F 3/1292* (2013.01); *G06F 3/1204* (2013.01); *G06F 3/126* (2013.01); *G06F 3/1285* (2013.01); *G06F 21/31* (2013.01); *G06F 21/44* (2013.01); *H04N 1/00037* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 2008/0184034 A1* | 7/2008 | Konno | G06F 21/608 713/183 |
| 2014/0240763 A1* | 8/2014 | Urakawa | G06F 3/1292 358/1.15 |
| 2016/0224289 A1* | 8/2016 | Yamanaka | H04N 1/00127 |
| 2018/0120898 A1* | 5/2018 | Law | H04N 21/4222 |
| 2018/0370758 A1* | 12/2018 | Huang | B66B 1/2408 |
| 2019/0028850 A1* | 1/2019 | Yamaguchi | H04W 4/48 |
| 2019/0077630 A1* | 3/2019 | Chapman | B66B 1/468 |

FOREIGN PATENT DOCUMENTS

JP 2017-112558 A 6/2017

* cited by examiner

*Primary Examiner* — Miya J Williams
(74) *Attorney, Agent, or Firm* — Workman Nydegger

(57) ABSTRACT

An electronic apparatus is an electronic apparatus in a system including a terminal device and the electronic apparatus and includes a first communication device that is disposed in a first position and capable of wireless communication with the terminal device, a second communication device that is disposed in a second position and capable of wireless communication with the terminal device, and a processing unit. The first communication device transmits a beacon signal (a first position beacon) including position specifying information for specifying the first position and the second communication device transmits a beacon signal (a second position beacon) including position specifying information for specifying the second position.

9 Claims, 13 Drawing Sheets

FIG. 6

| BEACON IDENTIFIER (POSITION) | IDENTIFICATION INFORMATION OF ELECTRONIC APPARATUS (MAC ADDRESS) | ARRANGEMENT POSITION SPECIFICATION INFORMATION (FRONT SURFACE/ REAR SURFACE INFORMATION) | USER IDENTIFICATION INFORMATION | RADIO FIELD INTENSITY AS REFERENCE OF DISTANCE |
|---|---|---|---|---|

| BEACON IDENTIFIER (ARRIVE) | IDENTIFICATION INFORMATION OF ELECTRONIC APPARATUS (MAC ADDRESS) | USER IDENTIFICATION INFORMATION |

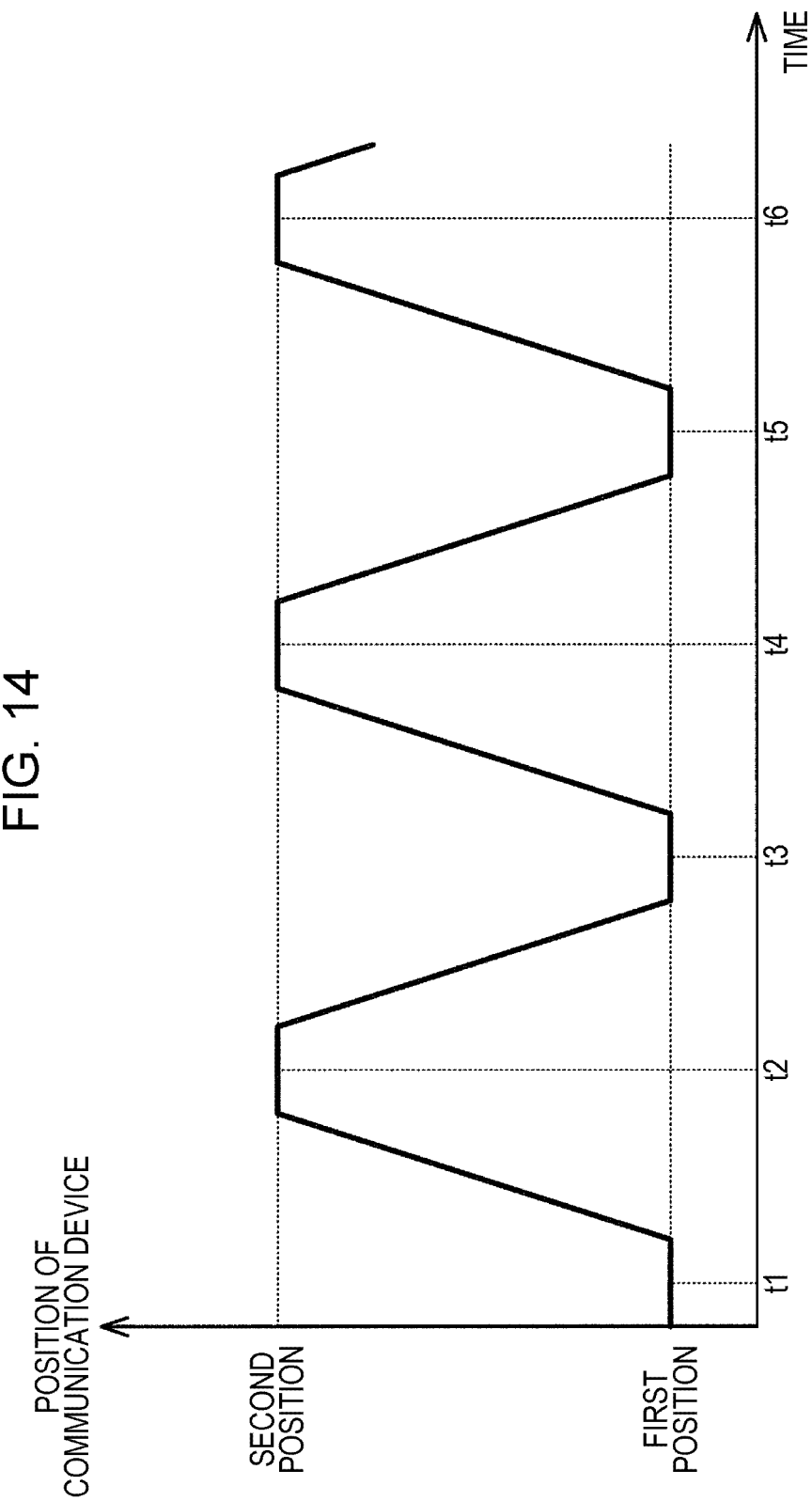

ALLOWING TERMINAL DEVICES TO DETERMINE POSITIONS OF ELECTRONIC APPARATUS

BACKGROUND

1. Technical Field

The present invention relates to an electronic apparatus and a non-transitory computer readable medium storing a program.

2. Related Art

In the related art, a method of receiving a beacon signal from other apparatus and determining a distance to the other apparatus based on the received beacon signal is known. For example, JP-A-2017-112558 discloses a multifunction peripheral (MFP) in which a Bluetooth low energy (BLE, Bluetooth is a registered trademark) chip is built. As in JP-A-2017-112558, by disposing the BLE chip in an electronic apparatus and transmitting the beacon signal from the electronic apparatus, it is possible to obtain a distance between the electronic apparatus and a terminal device in the terminal device in which the beacon signal is received.

In addition, various types of methods for executing any process with triggering that the terminal device approaches the electronic apparatus based on the distance obtained using the beacon signal are disclosed.

In the related art method, in a case where a distance between the terminal device and the electronic apparatus approaches, any process is executed. Therefore, even in a case where a user accidentally happened to pass through the vicinity of the electronic apparatus, the process is executed. That is, in the related art method, since only the distance between the terminal device and the electronic apparatus is taken into consideration, an appropriate process considering a more specific positional relationship (for example, direction) cannot be executed.

SUMMARY

An advantage of some aspects of the invention is to provide an electronic apparatus that is capable of executing a process considering a positional relationship (direction) between a terminal device and the electronic apparatus, a non-transitory computer readable medium storing a program, or the like.

According to an aspect of the invention, it is related to an electronic apparatus in a system including a terminal device and an electronic apparatus, the apparatus including a first communication device that is disposed in a first position of the electronic apparatus and capable of wireless communication with the terminal device, a second communication device that is disposed in a second position different from the first position of the electronic apparatus and capable of wireless communication with the terminal device, and a processing unit that controls the first communication device and the second communication device, in which the processing unit causes the first communication device to transmit a first beacon signal including first position specifying information for the terminal device to specify the first position, and causes the second communication device to transmit a second beacon signal including second position specifying information for the terminal device to specify the second position.

In this case, the electronic apparatus includes a plurality of communication devices that are disposed in different positions, and each communication device transmits a beacon signal including information for specifying a disposing position. On the receiving side apparatus (terminal device), it is possible to receive a plurality of beacon signals and specify that each beacon signal is a signal output from which position. In this manner, it possible to estimate not only the distance to the electronic apparatus but also the positional relationship with the electronic apparatus in the receiving side apparatus.

In the apparatus, the terminal device in the system may determine whether the electronic apparatus and the terminal device are in a given positional relationship based on the first position specifying information included in the first beacon signal received from the first communication device and the second position specifying information included in the second beacon signal received from the second communication device, and in a case where it is determined that the electronic apparatus and the terminal device are in the given positional relationship, transmit execution instruction information of a job to the electronic apparatus.

In this case, in a case where it is determined that the electronic apparatus and the terminal device are in the given positional relationship, by transmitting the job execution instruction information from the terminal device, it is possible to execute the job in consideration of the positional relationship between the electronic apparatus and the terminal device.

In the apparatus, an operation interface unit is further included, and the given positional relationship may indicate a positional relationship in which a distance between the terminal device and the electronic apparatus is less than a threshold value on a front side of the electronic apparatus on which the operation interface unit is provided.

In this case, it is possible to cause the terminal device to execute the determination of the positional relationship with the operation interface unit as a reference.

In the apparatus, the terminal device in the system may transmit the execution instruction information to the electronic apparatus by transmitting a beacon signal including the execution instruction information.

In this case, it is possible to transmit and receive the execution instruction information using the beacon signal.

In the apparatus, the terminal device in the system may transmit a terminal beacon signal including user identification information for identifying a user of the terminal device and the execution instruction information, and when the first communication device or the second communication device receives the terminal beacon signal, the processing unit may determine whether a setting for performing an authentication process in an execution of a job is valid, and in a case where it is determined that the setting is valid, execute a job waiting for authentication of the user identified by the user identification information included in the terminal beacon signal according to an execution instruction of the job.

In this case, by including the user identification information in the beacon signal from the terminal device, it is possible to properly specify the job waiting for authentication to be executed.

In the apparatus, the terminal device in the system may transmit a terminal beacon signal including identification information of the electronic apparatus, user identification information for identifying the user, and the execution instruction information, and when the first communication device or the second communication device receives the terminal beacon signal, the processing unit may determine whether the identification information of the electronic apparatus included in the terminal beacon signal matches the own identification information, and in a case where it is determined that the identification information matches the own identification information, execute a job waiting for authentication of the user identified by the user identification information included in the terminal beacon signal according to the execution instruction of the job.

In this case, by including the identification information of the electronic apparatus in the beacon signal from the terminal device, it is possible to properly specify to which the electronic apparatus the execution instruction information is transmitted as the target.

In the apparatus, the processing unit may cause the first communication device to transmit the first beacon signal including user identification information for identifying a user having a job waiting for authentication, and cause the second communication device to transmit the second beacon signal including the user identification information for identifying the user having the job waiting for authentication, and when the first beacon signal and the second beacon signal are received, the terminal device may determine whether the user identification information matching user identification information for identifying the user of the terminal device is included in the first beacon signal and the second beacon signal, and in a case where it is determined that the user identification information is included in the first beacon signal and the second beacon signal, determines whether the electronic apparatus and the terminal device are in a given positional relationship, and in a case where it is determined that the electronic apparatus and the terminal device are in a given positional relationship, transmit the execution instruction information of the job to the electronic apparatus.

In this case, by including the user identification information in the beacon signal transmitted by the first communication device and the second communication device, since it is possible to identify the receiving side apparatus (terminal device), the target apparatus appropriately process the beacon signal, and it is possible to omit the process on apparatus that is not a target.

In the apparatus, the first communication device may be disposed at a location in a first positional relationship with respect to the operation interface unit, and the second communication device may be disposed at a location in a second positional relationship different from the first positional relationship with respect to the operation interface unit.

In this case, by disposing a plurality of communication devices with reference to the operation interface unit, it is possible to appropriately execute processing based on the beacon signal at the receiving side apparatus, and the like.

In the apparatus, the first communication device may be disposed at a front side of the electronic apparatus which is an operation interface unit side and the second communication device may be disposed at a rear side of the electronic apparatus.

In this case, it is possible to accurately execute the estimation process as to whether the terminal device is positioned on the front side or the rear side of the electronic apparatus.

In the apparatus, the first beacon signal transmitted by the first communication device and the second beacon signal transmitted by the second communication device may include identification information of the electronic apparatus.

In this case, since it is possible to specify the electronic apparatus of a transmission source in the terminal device on the receiving side, it is possible to transmit the execution instruction information to appropriate the electronic apparatus as a target.

According to another aspect of the invention, it is related to an electronic apparatus in a system including a terminal device and an electronic apparatus, the apparatus including a communication device that is capable of wireless communication with the terminal device, a position changing mechanism that changes a position of the communication device, and a processing unit that controls the communication device, in which in a case where the communication device is set in a first position of the electronic apparatus, the processing unit causes the communication device to transmit a beacon signal including a first position specifying information for specifying the first position by the position changing mechanism, and in a case where the communication device is set in a second position different from the first position of the electronic apparatus, the processing unit causes the communication device to transmit a beacon signal including a second position specifying information for specifying the second position by the position changing mechanism.

In this case, the electronic apparatus moves the communication device by the position changing mechanism, and the communication device transmits the beacon signal including the position specifying information from the different plural positions. On the receiving side apparatus (terminal device), it is possible to receive a plurality of beacon signals and specify that each beacon signal is a signal output from which position. In this manner, it possible to estimate not only the distance to the electronic apparatus but also the positional relationship with the electronic apparatus in the receiving side apparatus.

According to still another aspect of the invention, it is related to an electronic apparatus in a system including a terminal device and an electronic apparatus, the apparatus including a communication device that is capable of wireless communication with the terminal device, a processing unit that performs an execution process of a job, and a directional member having an opening at a front side which is an operation interface unit side of the electronic apparatus and directing a beacon signal output from the communication device to the front side, in which when the beacon signal is received from the communication device, the terminal device obtains a distance between the terminal device and the electronic apparatus based on a radio field intensity of the beacon signal, and in a case where the obtained distance is equal to or lower than a threshold value, the terminal device transmits execution instruction information of a job to the electronic apparatus.

In this case, the electronic apparatus transmits a beacon signal having directionality to the front side, and receives execution instruction information from the terminal device that is received the beacon signal. In this manner, since it is the job execution condition that the terminal device is positioned on the front side, it is possible to execute the job in consideration of the positional relationship between the terminal device and the electronic apparatus.

According to a further still another aspect of the invention, it is related to a non-transitory computer readable medium storing a program for causing a terminal device to function as a communication unit that is capable of wireless communication with the electronic apparatus and a processing unit, in which the communication unit receives a first beacon signal including first position specifying information for specifying a first position from a first communication device disposed in the first position of the electronic apparatus and receives a second beacon signal including second position specifying information for specifying a second position from a second communication device disposed in the second position different from the first position of the electronic apparatus, and the processing unit determines whether the terminal device and the electronic apparatus are in a given positional relationship based on the first position specifying information included in the first beacon signal and the second position specifying information included in the second beacon signal.

In this case, it is possible to receive a plurality of beacon signals and to specify from which position of each electronic apparatus piece the beacon signals output. In this manner, it is possible to estimate not only the distance to the electronic apparatus but also the positional relationship with the electronic apparatus.

In the apparatus, the processing unit may determine whether the terminal device is positioned on a front side, which is an operation interface unit side, of the electronic apparatus, or on a rear side of the electronic apparatus as a determination whether the terminal device and the electronic apparatus are in the given positional relationship.

In this case, it is possible to accurately execute an estimation process as to whether the terminal device is positioned on the front side or the rear side of the electronic apparatus.

BRIEF DESCRIPTION OF THE DRAWINGS

The invention will be described with reference to the accompanying drawings, wherein like numbers reference like elements.

FIG. 6 illustrates an example of a data structure of a position beacon.

FIG. 14 is a view for illustrating a driving method of a communication device by a position changing mechanism.

DESCRIPTION OF EXEMPLARY EMBODIMENTS

Hereinafter, an embodiment will be described. The embodiment described below is not intended to unduly limit the content of the invention described in the appended claims. It is not always the case that all configurations described in the embodiment are the essential constituent elements of the invention.

1. Communication System

Figure 1:
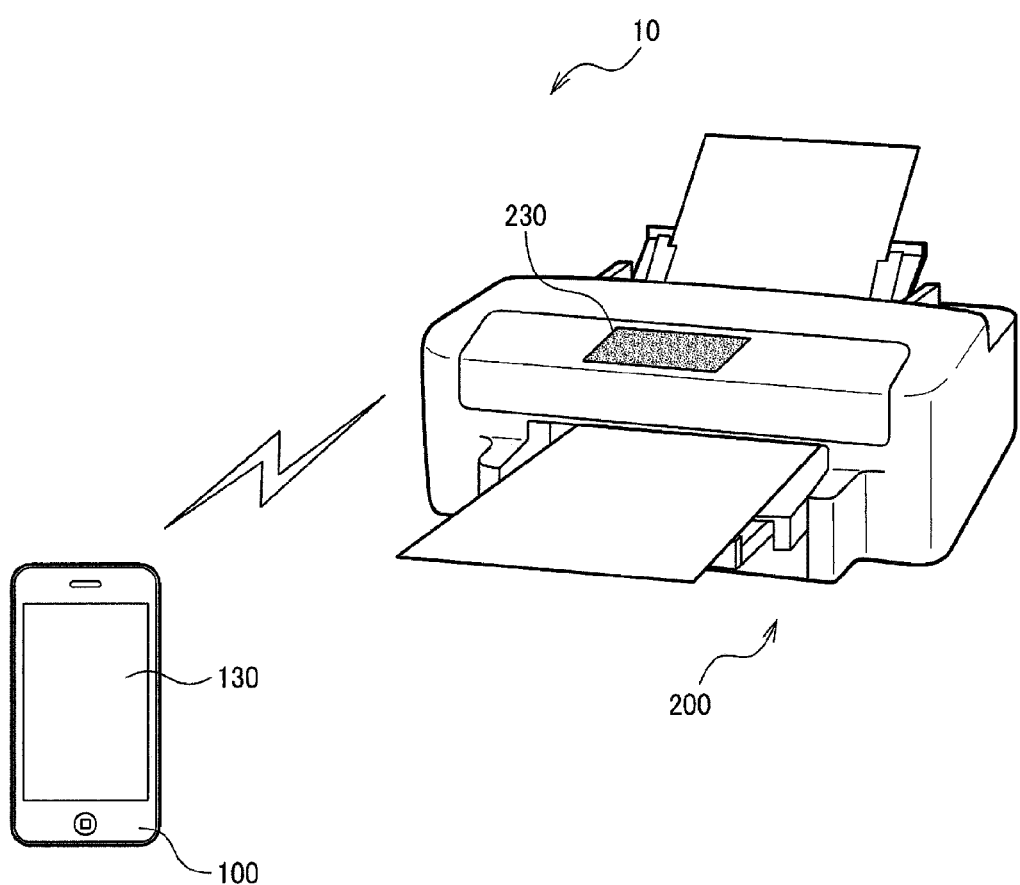
FIG. 1 illustrates a configuration example of a communication system including a terminal device and an electronic apparatus.

FIG. 1 is a diagram schematically illustrating an example of a communication system 10 of the invention. The communication system 10 includes a terminal device 100 and an electronic apparatus 200.

The terminal device 100 is a portable terminal device such as a smartphone or a tablet terminal. The electronic apparatus 200 is, for example, a printer (printing device). Alternatively, the electronic apparatus 200 may be a scanner, a facsimile device or a copier. The electronic apparatus 200 may be a multifunction device having a plurality of functions, and a multifunction device having a printing function is also an example of a printer. Alternatively, the electronic apparatus 200 may be a projector, a head mounted type display device, wearable apparatus (a list type wearable device, or the like), biological information measuring apparatus (a pulse meter, a pedometer or an activity meter, or the like), a robot, video apparatus (camera or the like), mobile information terminal (smartphone, portable game machine, or the like), or physical quantity measuring apparatus.

The communication system 10 is not limited to the configuration of FIG. 1, and various modifications such as addition of other components are possible. For example, one terminal device 100 may be capable of receiving beacon signals from a plurality of an electronic apparatus 200. Alternatively, the beacon signal from one electronic apparatus 200 may be received by a plurality of terminal devices 100, and determination of a distance and a positional relationship to be described later may be executed in each terminal device 100. In addition, the point that the modification such as the omission or addition of the constituent elements is possible is the same in FIGS. 2 and 3 to be described later.

The terminal device 100 and the electronic apparatus 200 are capable of wireless communication. The wireless communication here is a communication conforming to the Bluetooth standard, and in a narrow sense it is a communication conforming to the Bluetooth Low Energy (BLE) standard. However, the terminal device 100 and the electronic apparatus 200 can also perform wireless communication according to a standard different from the BLE, for example, communication compliant with the Wi-Fi (registered trademark) standard.

Figure 2:
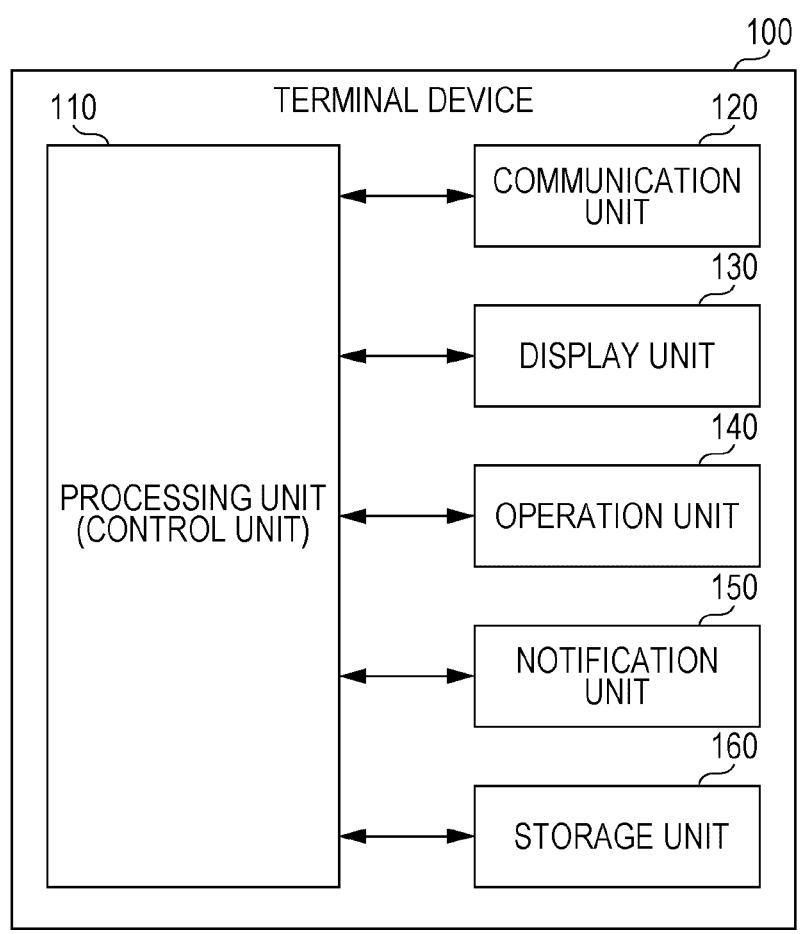
FIG. 2 illustrates a configuration example of the terminal device.

FIG. 2 is a block diagram illustrating an example of the configuration of the terminal device 100. The terminal device 100 includes a processing unit 110 (processor), a communication unit 120 (communication interface), a display unit 130 (display), an operation unit 140 (operation buttons, or the like), a notification unit 150 (notification interface), and a storage unit 160 (memory).

The processing unit 110 (processor and controller) controls each unit of the communication unit 120, the display unit 130, the operation unit 140, the notification unit 150, and the storage unit 160.

Each process (each function) of the present embodiment performed by the processing unit 110 can be realized by a processor (a processor including hardware). For example, each processing of the present embodiment can be realized by the processor that operates based on information of a program or the like and a memory (storage device) that stores information of a program or the like. In the processor here, for example, the functions of each unit may be realized by individual hardware, or the functions of each unit may be realized by integrated hardware. For example, the processor may include hardware, which hardware may include at least one of circuitry for processing digital signals and circuitry for processing analog signals. For example, the processor can be constituted by one or a plurality of circuit devices (for example, IC or the like) mounted on a circuit substrate and one or plural circuit elements (for example, resistors, capacitors, or the like). The processor may be, for example, a central processing unit (CPU). However, the processor is not limited to a CPU and various processors such as a graphics processing unit (GPU) or a digital signal processor (DSP) can be used. The processor may be a hardware circuit based on an application specific integrated circuit (ASIC). In addition, the processor may be constituted by a plurality of CPUs, or may be constituted by hardware circuits based on a plurality of ASICs. In addition, the processor may be configured by a combination of a plurality of CPUs and hardware circuits based on a plurality of ASICs.

The communication unit 120 (wireless communication unit) is realized by at least one communication device (wireless communication device). The communication unit 120 includes a wireless communication device (wireless communication chip) that executes wireless communication conforming to the BLE standard. However, the communication unit 120 may include a wireless communication device that executes wireless communication conforming to a standard other than the BLE standard.

The display unit 130 is configured of a display or the like that displays various kinds of information items to a user, and the operation unit 140 is configured of a button or the like that receives an input operation from the user. The display unit 130 and the operation unit 140 may be integrally configured with a touch panel, for example. The notification unit 150 informs the user. The notification unit 150 may be, for example, a speaker for notifying by sound, a vibration unit (vibration motor) for notifying by vibration, or a combination thereof.

The storage unit 160 (storage device and memory) stores various kinds of information items such as data and programs. The processing unit 110 or the communication unit 120 operates, for example, using the storage unit 160 as a work area. The storage unit 160 may be a semiconductor memory such as an SRAM, a DRAM, a register, a magnetic storage device such as a hard disk device (HDD), or an optical device such as an optical disk device. It may be an expression storage device. For example, the storage unit 160 stores computer readable instructions, and by executing the instructions by the processing unit 110 (processor), the functions of each unit (communication unit, processing unit) of the terminal device 100 are realized. The instruction here may be an instruction of an instruction set constituting a program or a command instructing an operation to a hardware circuit of a processing unit 110 (processor).

Figure 3:
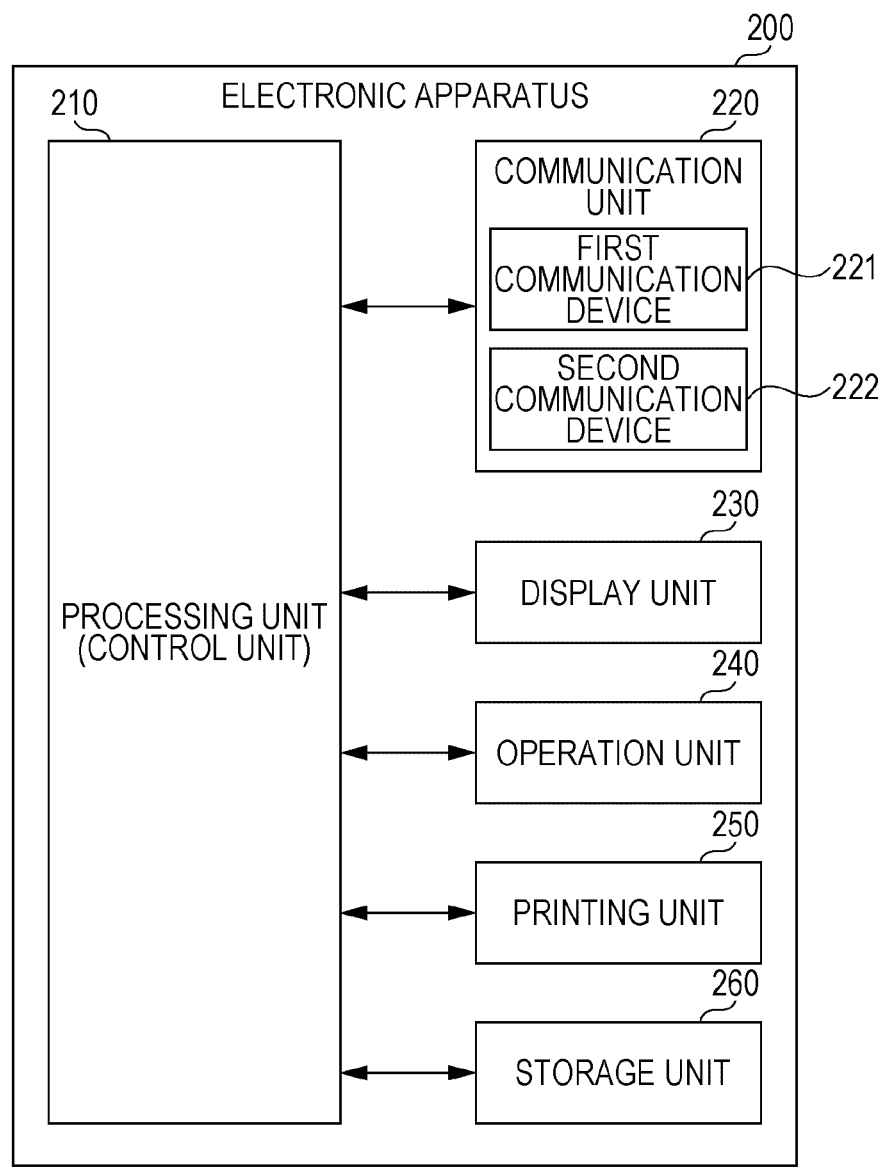
FIG. 3 illustrates a configuration example of the electronic apparatus.

FIG. 3 is a block diagram illustrating an example of the configuration of the electronic apparatus 200. FIG. 3 illustrates the electronic apparatus 200 (printer and multifunction peripheral) having a printing function. However, as described above, the electronic apparatus 200 can be extended to a printer other than a printer. The electronic apparatus 200 includes a processing unit 210 (processor), a communication unit 220 (communication interface), a display unit 230 (display), an operation unit 240 (operation panel), a printing unit 250, and a storage unit 260 (memory).

The processing unit 210 (processor and controller) controls each unit (communication unit, storage unit, printing unit, or the like) of the electronic apparatus 200 and performs various processes of the present embodiment. For example, the processing unit 210 can include a plurality of CPUs (MPU and microcomputer) such as a main CPU, a sub CPU, and the like. The main CPU (main control substrate) controls each part of the electronic apparatus 200 and performs overall control. For example, in a case where the electronic apparatus 200 is a printer, the sub CPU performs various processes concerning printing. Alternatively, the CPU for communication processing may be further provided.

Each processing (each function) of the present embodiment performed by the processing unit 210 can be realized by a processor (a processor including hardware). For example, each processing of the present embodiment can be realized by the processor that operates based on information of a program or the like and a memory (storage device) that stores information of a program or the like. In the processor here, for example, the functions of each unit may be realized by individual hardware, or the functions of each unit may be realized by integrated hardware. For example, the processor may include hardware, which hardware may include at least one of circuitry for processing digital signals and circuitry for processing analog signals. For example, the processor can be constituted by one or a plurality of circuit devices (for example, IC or the like) mounted on a circuit substrate and one or plural circuit elements (for example, resistors, capacitors, or the like). The processor may be, for example, a CPU. However, the processor is not limited to a CPU and various processors such as a GPU or a DSP can be used. The processor may be a hardware circuit based on an ASIC. In addition, the processor may be constituted by a plurality of CPUs, or may be constituted by hardware circuits based on a plurality of ASICs. In addition, the processor may be configured by a combination of a plurality of CPUs and hardware circuits based on a plurality of ASICs.

The communication unit 220 includes a first communication device 221 (a first wireless communication chip) and a second communication device 222 (a second wireless communication chip). The first communication device 221 and the second communication device 222 execute wireless communication conforming to the BLE standard. However, the communication unit 220 may include a wireless communication device that executes wireless communication conforming to a standard other than the BLE standard.

The display unit 230 is configured of a display or the like that displays various kinds of information items to a user, and the operation unit 240 is configured of a button or the like that receives an input operation from the user. The display unit 230 and the operation unit 240 may be integrally configured with a touch panel, for example.

The printing unit 250 includes a printing engine. The printing engine is a mechanical configuration for executing printing of an image on a print medium. The printing engine includes, for example, a transport mechanism, an ejection head of an ink jet system, a driving mechanism of a carriage including the ejection head, and the like. The printing engine prints an image on a print medium by ejecting ink from the ejection head to a print medium (paper or cloth) conveyed by the transporting mechanism. The specific configuration of the printing engine is not limited to the one exemplified configuration, and it may be configuration that prints with toner by a laser method. In addition, the printing unit 250 may include a sensor that detects various physical quantities related to the operating state of the printing engine, a counter that counts the detection result, and the like. By using sensors and counters, it is possible to acquire information such as the drive amount of the transporting mechanism (the amount of rotation of the motor), the number of reciprocations of the ejection head, the amount of ink consumption, and the like.

The storage unit 260 (storage device and memory) stores various kinds of information such as data and programs. The processing unit 210 or the communication unit 220 operates, for example, using the storage unit 260 as a work area. The storage unit 260 may be a semiconductor memory, a register, a magnetic storage device, or an optical storage device. The storage unit 260 stores the data output from the printing unit 250 as information indicating the operation status of the printer.

In addition, the storage unit 260 (storage device) may store data transmitted from the terminal device 100 by wireless communication. The data here is, for example, print data used for printing in the printing unit 250. However, the storage of data from the terminal device 100 is not limited to that performed in the storage unit 260 built in the electronic apparatus 200. For example, the electronic apparatus 200 may have an interface (not illustrated), and data from the terminal device 100 may be stored in an external storage device connected via the interface. The external storage device may be), for example, an HDD, solid state drive (SSD), flash memory connected by a universal serial bus (USB) inserted in the card slot Standard storage device), may be an SD card (including a storage device of a related standard such as a microSD card) inserted in a card slot, or may be another storage device connectable to the electronic apparatus 200.

2. Determination of Positional Relationship (Front Rear Surface Determination)

Next, the method of the present embodiment will be described in detail. First, after describing the outline of the process, the electronic apparatus 200 side and the terminal device 100 side will be described. Thereafter, a description will be given of a method of estimating the distance using the received radio field intensity of the beacon signal and a specific example in the case where the job is a job (authentication job, more specifically, authenticated printing) accompanied by the authentication process.

2.1 Outline

Apparatus equipped with the BLE chips is widely known as disclosed in JP-A-2017-112558. There are also known various methods for estimating the distance between apparatus pieces using the beacon signal and performing any process based on the estimated distance. The beacon signal here is a signal transmitted using wireless communication and is a signal used for acquiring information such as a position and confirming the presence of the device. The beacon signal is transmitted, for example, without specifying a transmission destination, and is received by a terminal existing within the range. The beacon signal here is a signal conforming to the Bluetooth communication standard, specifically, an advertisement packet used for broadcasting data. However, the beacon signal can be expanded to a broadcast signal (SSID broadcast) or the like conforming to the Wi-Fi communication standard.

In the example of performing an authentication job (authenticated printing) described later with reference to FIG. 12, the distance between the terminal device 100 of the user who submitted the job and the printer is determined, and in a case where the distance becomes equal to or less than a predetermined value, authentication and executes a job waiting for an authentication process (hereinafter, referred to as a job waiting for an authentication). In this way, since the user can omit the input of the authentication information, it is possible to reduce the burden on the user while improving the security.

However, in the related art method, only determination is performed based on the distance and the positional relationship of the apparatus is not considered. In the case of authenticated printing, according to the conventional method of determining only the distance, the authenticated printing is executed even when the user passes near the printer. In this case, even in a case where the user does not intend to collect the printed matters, since the printed matter is output, there is a possibility that the printed matters may be remained or removed and the advantage of authenticated printing is impaired. That is, in order to realize appropriate process, it is required to determine whether the probability that the user performs an operation (including recovery of the printed matters) on the electronic apparatus 200 is high and execute the job based on the determination result.

The electronic apparatus 200 according to the present embodiment is an electronic apparatus in a system (communication system 10) including the terminal device 100 and the electronic apparatus 200, and as illustrated in FIG. 3, the electronic apparatus 200 is provided in a first position of the electronic apparatus 200, the first communication device 221 disposed in a wireless communication with the terminal device 100, the second communication device 222 positioned in a second position different from the first position of the electronic apparatus 200 and capable of wireless communication with the terminal device 100, and a processing unit 210 that controls the first communication device 221 and the second communication device 222. The processing unit 210 causes the first communication device 221 to transmit a first beacon signal including first position specifying information for specifying the first position and causes the second communication device 222 to transmit a second beacon signal including second position specifying information for specifying the second position.

In the following description, the beacon signal transmitted from the electronic apparatus 200 side is referred to as a position beacon. Specifically, the first beacon signal transmitted by the first communication device 221 is referred to as a first position beacon, and the second beacon signal transmitted by the second communication device 222 is referred to as a second position beacon. In addition, the first position specifying information and the second position specifying information are collectively referred to as disposing position specifying information.

Here, the first position and the second position are positions different from each other and are positioned inside (including the surface) of the electronic apparatus 200. Specific examples of the first position and the second position will be described later with reference to FIG. 5. In addition, the disposing position specifying information is information indicating for specifying (identifying) whether the beacon signal is information (first position beacon) transmitted from the first position or information transmitted from the second position (second position beacon). The disposing position specifying information only needs to be able to identify between the first position and the second position. For example, in a case where the information is the first position, it becomes a first logic level (for example, "0"), and in a case where the information is the second position, the disposing position specifying information is 1 bit flag information which becomes the second logic level (for example, "1"). That is, the disposing position specifying information does not need to specify the absolute position (for example, the coordinate value in a given coordinate system) of the first position and the second position.

In this manner, by outputting the beacon signals from different positions of the electronic apparatus 200, the received radio field intensity of the beacon signal in the terminal device 100 is changed according to the positional relationship between the terminal device 100 receiving the beacon signal and the electronic apparatus 200. That is, the terminal device 100 can estimate not only the distance between the terminal device 100 and the electronic apparatus 200 but also the positional relationship based on the two beacon signals.

In general, in the electronic apparatus 200, it is possible to specify the side (front side) where the user is to operate when operating the electronic apparatus 200. If in an example of a printer (MFP), the side on which the operation panel is provided is presumed to be the front side. Therefore, by determining whether the terminal device 100 is positioned on the front side of the electronic apparatus 200 based on the two beacon signals, it is possible to estimate with high accuracy whether the user intends to operate the electronic apparatus 200. Therefore, it is possible to appropriately execute the job of the electronic apparatus 200.

However, the device that executes the determination of the positional relationship is the terminal device 100 that receives the beacon signal from the electronic apparatus 200. Therefore, after the first communication device 221 and the second communication device 222 transmit the beacon signal, in a case where the job execution instruction information is received from the terminal device 100 that received the beacon signal, the processing unit 210 of the electronic apparatus 200 receives job execution instruction information. In this manner, by using the execution instruction information from the terminal device 100 as a trigger, it is possible to execute a job in consideration of the positional relationship between the terminal device 100 and the electronic apparatus 200 in the electronic apparatus 200.

More specifically, the terminal device 100 in the system determines whether the electronic apparatus 200 and the terminal device 100 are in a given positional relationship based on the first position specifying information included in the first beacon signal received from the first communication device 221 and the second position specifying information included in the second beacon signal received from the second communication device 222, and in a case where the electronic apparatus 200 and the terminal device 100 are in the given positional relationship, transmits the execution instruction information of the job to the electronic apparatus 200. In a case where the terminal device 100 determines that the electronic apparatus 200 and the terminal device 100 are in the given positional relationship and the transmitted execution instruction information is received, the processing unit 210 performs a process of executing the job.

Here, the given positional relationship is a case where the electronic apparatus 200 includes the operation interface unit (operation unit 240), and indicates a positional relationship in which the distance between the terminal device 100 and the electronic apparatus 200 is less than the threshold value on the front side of the electronic apparatus 200 provided with the operation interface unit. Details of the operation interface unit and details of the positional relationship will be described later.

Figure 4:
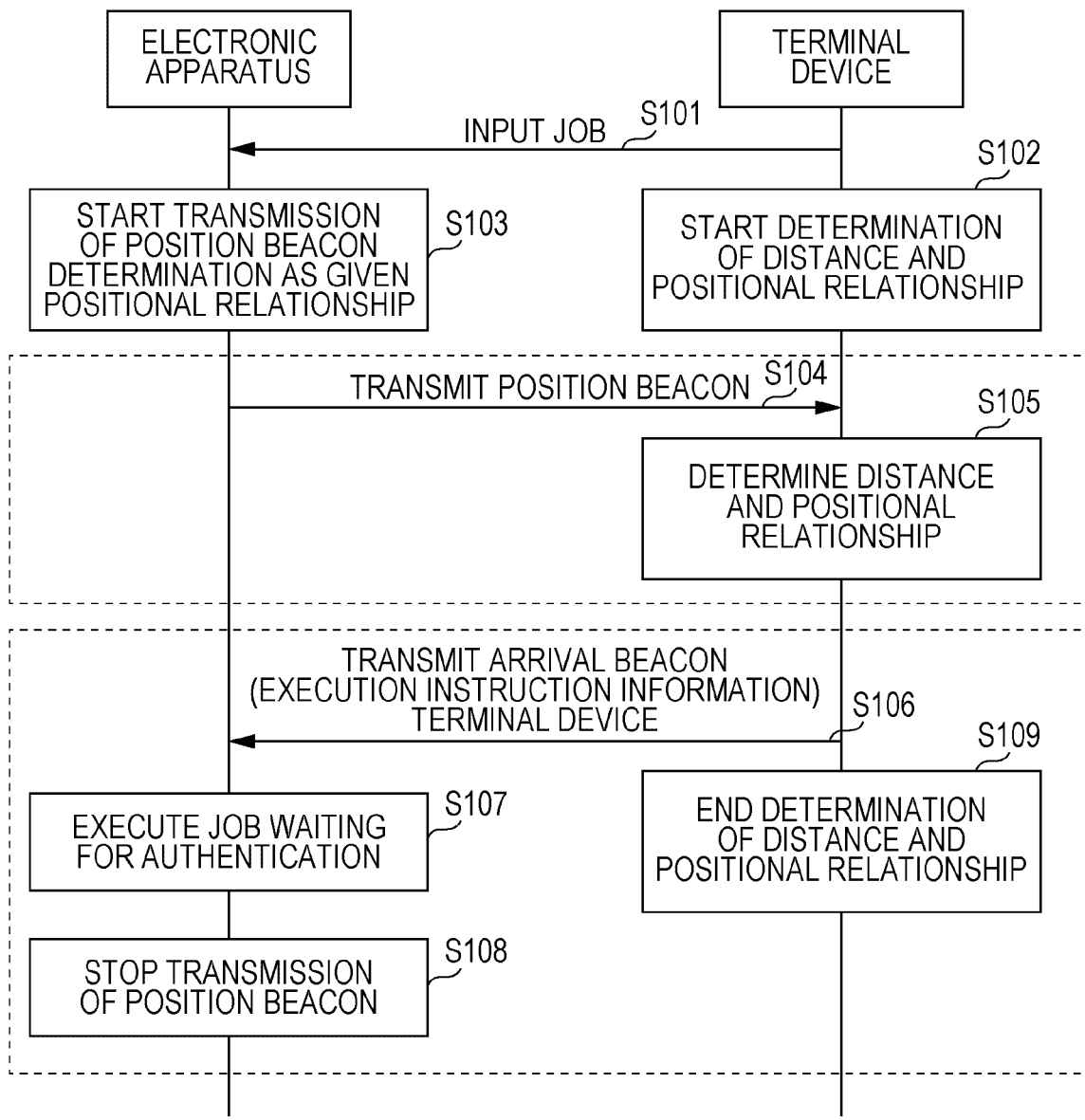
FIG. 4 is a sequence diagram for illustrating processes of the present embodiment.

FIG. 4 is a sequence diagram for illustrating the outline of the process of the present embodiment. FIG. 4 is an example of the process according to the present embodiment, and it is possible to omit a part of the process, or to perform a modification such as adding another process. For example, as will be described later as a modified example, in a case where power saving control or display screen control is performed as a job, the job input process from the terminal device 100 side illustrated in S101 is omitted.

When the process is started, the job is input (requested) from the terminal device 100 to the electronic apparatus 200 (S101). The submitted job (job waiting for an authentication) is executed on condition that the authentication process is completed. With the process of S101 as a trigger, the terminal device 100 starts the process of estimating the distance and the positional relationship based on the beacon signal (S102). In addition, with the process of S101 as a trigger, transmission of the position beacons (the first position beacon and the second position beacon) is started in the electronic apparatus 200 (S103).

The electronic apparatus 200 periodically transmits the position beacon (S104), and the terminal device 100 estimates the distance to the electronic apparatus 200 and estimates the positional relationship based on the estimated distance based on the received position beacon (S105). Details of the process of S105 will be described later with reference to FIG. 9 and the like. The processes in S104 and S105 are repeated in the terminal device 100 until it is determined that the terminal device 100 and the electronic apparatus 200 are in the given positional relationship.

In a case where it is determined that the terminal device 100 and the electronic apparatus 200 are in the given positional relationship, the terminal device 100 transmits job execution instruction information to the electronic apparatus 200 (S106). The process of S106 corresponds to the transmission process of the arrival beacon (terminal beacon signal), for example.

With the reception of the arrival beacon in S106 as a trigger, in the electronic apparatus 200, the job waiting for an authentication input in S101 is executed (S107). In addition, since the execution of the job waiting for an authentication is completed, the electronic apparatus 200 ends the transmission process of the position beacon (S108), and the terminal device 100 ends the distance and positional relationship estimation process (S109).

However, the number of jobs to be input to the electronic apparatus 200 is not limited to one, and the number of terminal devices 100 to be input sources is not limited to one. Therefore, even after the process in S107, there are cases where there is an unexecuted job waiting for an authentication in the electronic apparatus 200. In that case, the process of S108 is not performed, and the transmission process of the position beacon is continued.

Further, the number of jobs input by the terminal device 100 is not limited to one, and the number of electronic apparatuses 200 to be submitted is not limited to one. Therefore, even after the process of S107, there are cases where there is a job waiting for an authentication that is input to a given electronic apparatus 200 from the terminal device 100 and that is not executed yet in the electronic apparatus 200. In that case, the process of S109 is not performed and the estimation process of the distance and positional relationship is continued.

Figure 5:
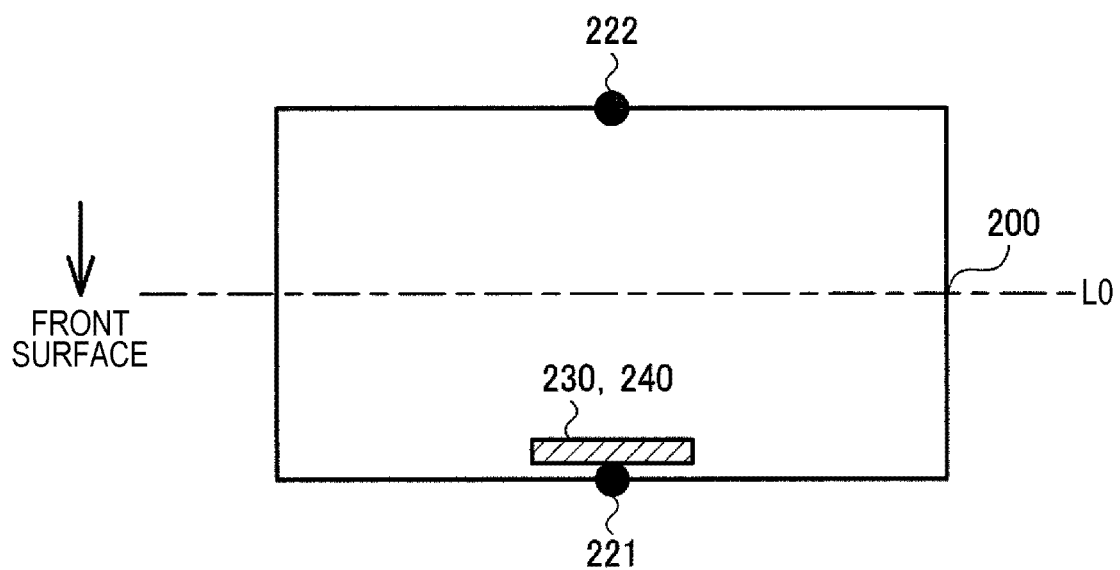
FIG. 5 is a schematic view for illustrating a first position, a second position, and a front side.

2.2 Example of Disposing of Communication Device and Position Beacon in Electronic Apparatus FIG. 5 is an example of a schematic view (simplified top view) in which the electronic apparatus 200 is observed from a viewpoint set in a vertically upward direction. The electronic apparatus 200 includes an operation interface unit. The operation interface unit here is the operation unit 240 (operation panel). The operation panel is not limited to a touch panel integrated with the display unit 230, and may be a panel on which operation buttons and the like are arranged.

As illustrated in FIG. 5, the first communication device 221 is disposed in a position in a first positional relationship with the operation interface unit, and the second communication device 222 is disposed in a position different from the first positional relationship with the operation interface unit 2. By disposing the first communication device 221 and the second communication device 222 at different positions with respect to the operation interface unit, it is possible to estimate the positional relationship between the terminal device 100 and the operation interface unit.

More specifically, the first communication device 221 is disposed at the front side of the electronic apparatus 200 on the operation interface unit side, and the second communication device 222 is disposed at the rear side of the electronic apparatus 200.

That is, the front surface and the back surface in the present embodiment are set based on the operation interface unit (the operation portion 240, the operation panel), the side on which the operation interface unit is provided in the electronic apparatus 200 is the front side, and the side opposite to the side where the operation interface unit is provided is the rear side. Then, the front side is disposed at the first communication device 221 and the second communication device 222 is disposed at the rear side. In other words, the first positional relationship is a positional relationship relatively close to the operation interface unit, and the second positional relationship is a positional relationship relatively distant from the operation interface unit. In this manner, it is possible to estimate whether the terminal device 100 is positioned on the front side or the rear side of the electronic apparatus 200.

For example, as a result of estimating the distance L1 between the terminal device 100 and the first communication device 221 and the distance L2 between the terminal device 100 and the second communication device 222 by the method to be described later with reference to FIG. 11, even if an expression of L1<L2 is satisfied, it can be estimated that the terminal device 100 is positioned on the front side of a straight line L0 (for example, FIG. 7 described later). In addition, if an expression of L1≥L2 is satisfied, it can be estimated that the terminal device 100 is positioned on the rear side (inclusive of L0) than the straight line L0 (for example, FIG. 8 to be described later). The straight line L0 is a set of points at which the distance from the first communication device 221 (first position) is equal to the distance from the second communication device 222 (second position).

FIG. 5 illustrates an example of the disposing of the first communication device 221 and the second communication device 222, and various modification examples can be implemented at specific positions. For example, a condition that a set (straight line L0) of points having the same distance from the first communication device 221 and the distance from the second communication device 222 is a straight line that distinguishes the front side and the rear side of the electronic apparatus 200 is satisfied, the specific position of each communication device is irrelevant.

However, if the first communication device 221 and the second communication device 222 are disposed extremely close to each other, since the difference in the received radio field intensity becomes small, the estimation accuracy of the positional relationship decreases. Therefore, the distance between the first communication device 221 and the second communication device 222 is preferably large. Preferably, as illustrated in FIG. 5, the first communication device 221 is disposed at the end portion (or a position sufficiently close to the end portion) on the operation interface unit side of the electronic apparatus 200, and the second communication device 222 is disposed at the end portion (or a position sufficiently close to the end portion) opposite to the operation interface unit side of the electronic apparatus 200.

FIG. 6 illustrates an example of the data structure of the position beacon transmitted by the first communication device 221 and the second communication device 222. The position beacon includes a beacon identifier, identification information of the electronic apparatus 200, disposing position specifying information, user identification information, and radio field intensity information which is a reference of the distance.

The beacon signals can be used for various purposes, and in many cases, a plurality of types of beacon signals are transmitted and received between the electronic apparatus 200 and the terminal device 100. The beacon identifier is information for specifying in which application the beacon signal is used. The beacon identifier included in the position beacon is information indicating that the beacon signal is a position beacon and is information different from a beacon identifier of an arrival beacon described later, for example.

The identification information of the electronic apparatus 200 is information uniquely specifying the electronic apparatus 200. The identification information of the electronic apparatus 200 is, for example, the MAC address of the electronic apparatus 200, but other information may be used.

The disposing position specifying information is information for identifying the first position and the second position as described above. Specifically, the disposing position specifying information indicates whether the beacon signal is a signal transmitted from a first position (narrowly defining, the front side of the electronic apparatus 200), or a second position (rear side of the electronic apparatus 200), Which is a signal transmitted from a mobile station.

Figure 9:
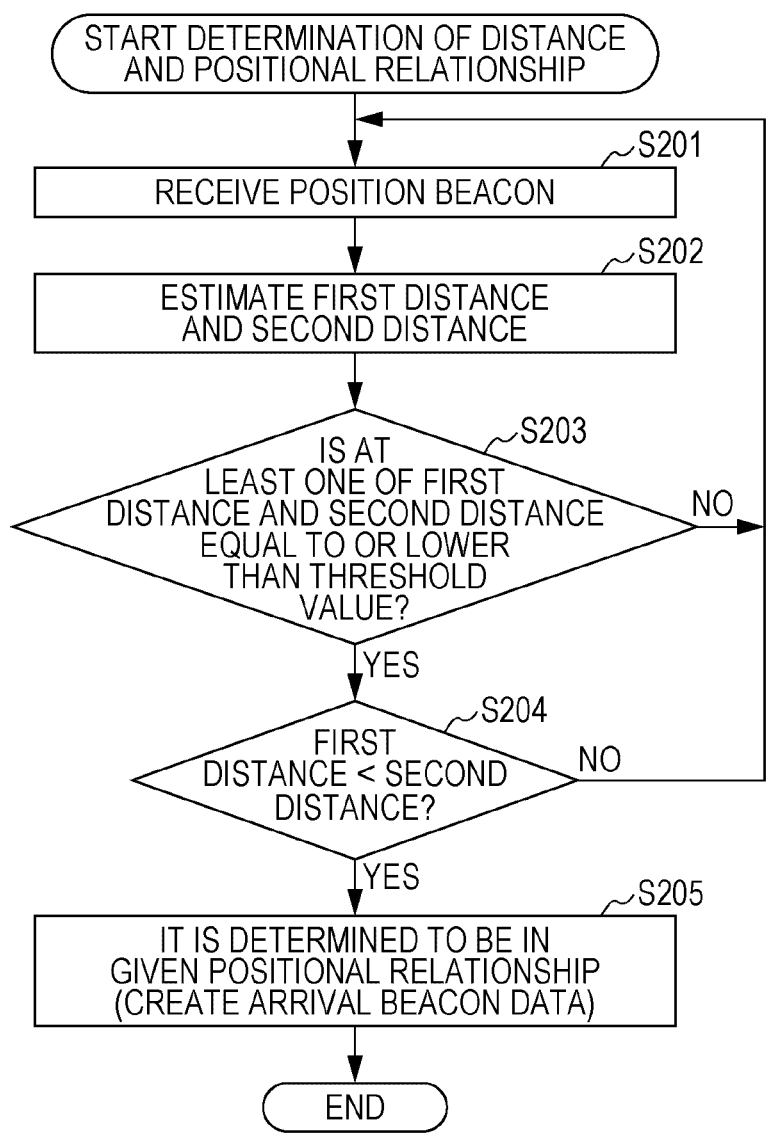
FIG. 9 is a flowchart for illustrating processes of the terminal device according to the present embodiment.

The user identification information is information for uniquely specifying the user. The user identification information is used in a case where only the terminal device 100 of a specific user executes the process of estimating the distance and the positional relationship based on the position beacon as in the modification implementation described later with reference to FIG. 13. Therefore, in a case where a process is executed without specifying the terminal device 100 as illustrated in FIG. 9, it is possible to omit the user identification information from the position beacon.

The user identification information may be the same as the identification information (MAC address, for example) of the terminal device 100 uniquely specifying the terminal device 100. However, when considering an aspect in which one user uses a plurality of terminal devices 100, it is desirable to separately provide the user identification information and the identification information of the terminal device 100. At that time, the terminal device 100 or the electronic apparatus 200 (or a server system or the like connectable to each device) hold information that associates the user with the terminal device 100.

The radio field intensity information serving as the reference of the distance is information used for estimating the distance between the terminal device 100 and the electronic apparatus 200 in the processing unit 110 of the terminal device 100 received the beacon signal. Details of the radio field intensity information will be described later.

As illustrated in FIG. 6, the first beacon signal (first position beacon) transmitted by the first communication device 221 and the second beacon signal (second position beacon) transmitted by the second communication device 222 include identification information of the electronic apparatus 200.

In this manner, in the terminal device 100 that is received the beacon signal, it is possible to specify the electronic apparatus 200 of the transmission source. Therefore, in the terminal device 100, it is possible to identify to which the electronic apparatus 200 the distance and the positional relationship are estimated. Furthermore, in a case where it is determined that it is in the given positional relationship, it is possible to appropriately determine which the electronic apparatus 200 is to be sent the execution instruction information. As will be described later, the execution instruction information may be transmitted (broadcasted) as a beacon signal (terminal beacon signal), and the electronic apparatus 200 may be specified in the beacon signal. Alternatively, the execution instruction information may be transmitted only to the electronic apparatus 200 by designating the address of the specific electronic apparatus 200.

2.3 Determination of Distance and Positional Relationship in Terminal Device

As described above, the electronic apparatus 200 transmits (broadcasts) the first position beacon and the second position beacon. The terminal device 100 receives the position beacon and estimates the distance and the positional relationship with the electronic apparatus 200. Hereinafter, details of processing in the terminal device 100 will be described.

As illustrated in FIG. 2, the terminal device 100 includes the communication unit 120 capable of wirelessly communicating with the electronic apparatus 200, and the processing unit 110. In a narrow sense, the storage unit 160 of the terminal device 100 stores the program, and the program causes the computer (the terminal device 100) to function as the communication unit 120 capable of wirelessly communicating with the electronic apparatus 200 and the processing unit 110. The communication unit 120 receives the first beacon signal (first position beacon) including the first position specifying information for specifying the first position from the first communication device 221 disposed in the first position of the electronic apparatus 200 and receives the second beacon signal (second position beacon) including the second position specifying information for specifying the second position from the second communication device 222 disposed in the second position of the electronic apparatus 200. The processing unit 110 determines whether the terminal device 100 and the electronic apparatus 200 are in the given positional relationship based on the first position specifying information included in the first beacon signal and the second position specifying information included in the second beacon signal.

As described above, the first position is a position on the front side where the operation interface unit is provided in a narrow sense, and the second position is a position on the rear side. Therefore, the processing unit 110 determines whether the terminal device 100 is positioned on the front side, which is the operation interface unit side, of the electronic apparatus 200, or whether it is positioned on the rear side of the electronic apparatus 200, based on whether the terminal device and the electronic apparatus are in the given positional relationship.

The processing unit 110 obtains the difference between the first position and the terminal device 100 (hereinafter, referred to as a first distance L1) based on the received radio field intensity of the first position beacon (hereinafter, referred to as the first received radio field intensity) and the radio field intensity information included in the first position beacon. A method of estimating the distance based on the received radio field intensity and the radio field intensity information will be described later with reference to FIG. 11. Similarly, the processing unit 110 obtains a received radio field intensity of the second position beacon (hereinafter, referred to as a second received radio field intensity) and a distance between the second position and the terminal device 100 (hereinafter, referred to as a second distance L2) based on the radio field intensity information included in the second position beacon.

Figure 7:
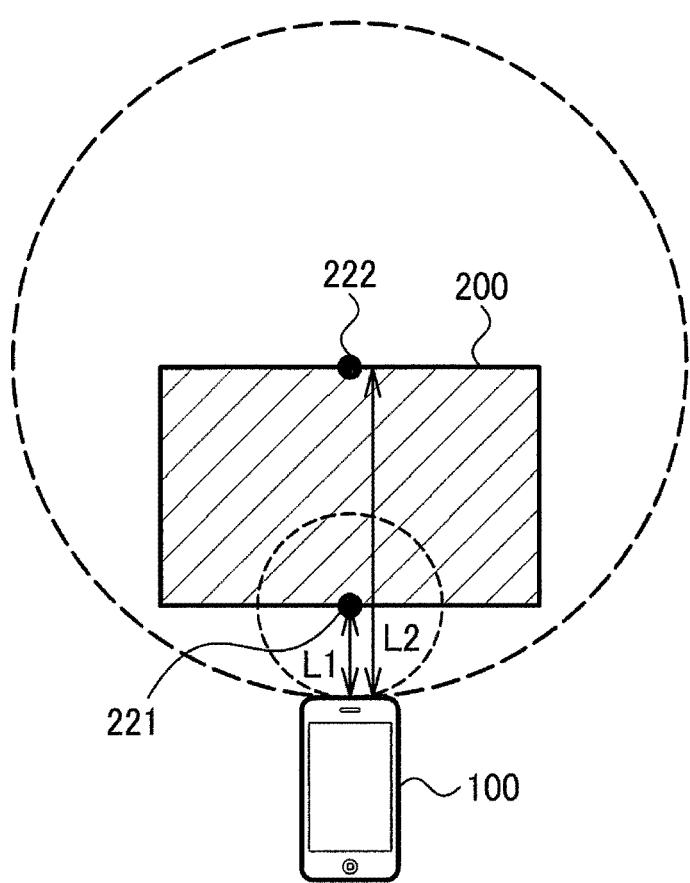
FIG. 7 is a schematic diagram of a case where the terminal device is positioned on the front side of the electronic apparatus.
Figure 8:
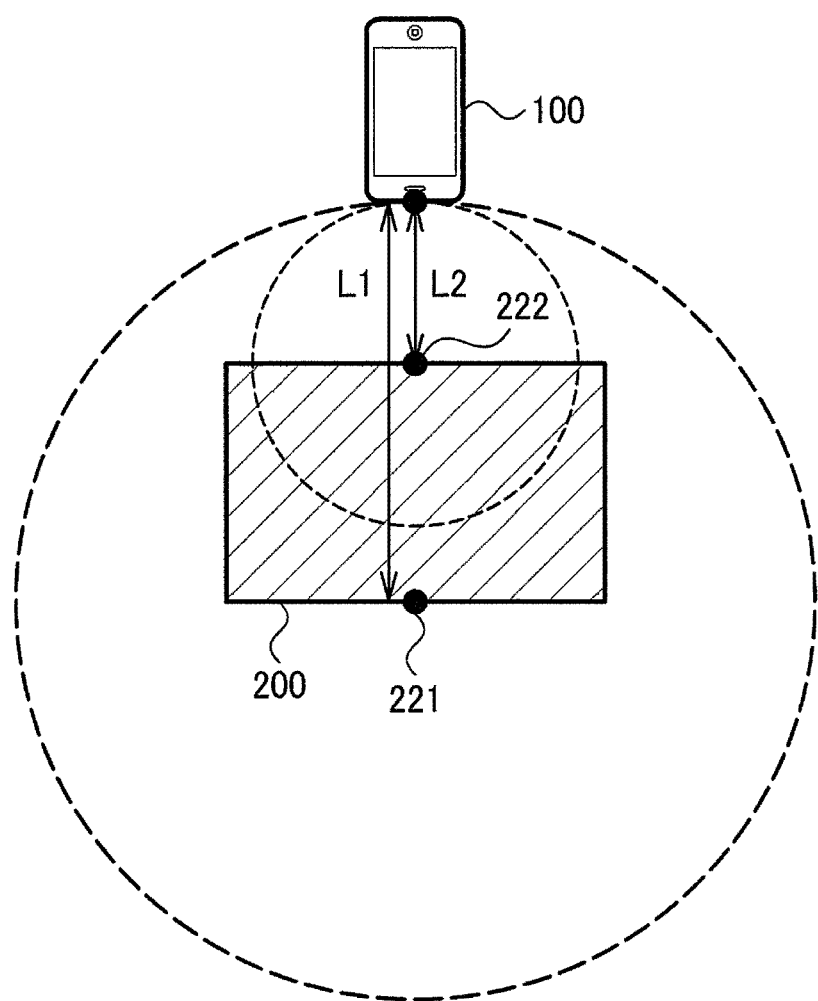
FIG. 8 is a schematic diagram of a case where the terminal device is positioned on the rear side of the electronic apparatus.

FIG. 7 is a schematic diagram for illustrating a relationship between L1 and L2 in a case where the terminal device 100 is positioned on the front side of the electronic apparatus 200. FIG. 8 is a schematic diagram for illustrating a relationship between L1 and L2 a case where the terminal device 100 is positioned on the rear side of the electronic apparatus 200.

As illustrated in FIG. 7, in a case where the terminal device 100 is positioned on the front side of the electronic apparatus 200, since the terminal device 100 is relatively close to the first position, the first distance L1 and the second distance L2, the condition of L1<L2 is satisfied. On the other hand, as illustrated in FIG. 8, in a case where the terminal device 100 is positioned on the rear side of the electronic apparatus 200, since the terminal device 100 is relatively close to the second position, in a case where the first distance L1 is compared with the second distance L2, the expression of L1>L2 is established. Therefore, the processing unit 110 determines that the terminal device 100 is positioned on the front side in the case L1<L2 and is positioned on the rear side in a case of L1≥L2.

However, in the present embodiment, it is important to determine whether the probability that the user performs an operation (including collecting printed matter or the like) on the electronic apparatus 200 is high. Even if the terminal device 100 is positioned on the front side of the electronic apparatus 200, if it is far from the electronic apparatus 200, it is unlikely that the user intends to operate the electronic apparatus 200. Therefore, in the present embodiment, it is also a condition for transmission of execution instruction information that the distance between the terminal device 100 and the electronic apparatus 200 is equal to or less than the predetermined threshold value. Hereinafter, processing using the condition that at least one of L1 and L2 is equal to or less than the threshold value will be described. However, the threshold value determination object may be only L1.

FIG. 9 is a flowchart for illustrating the distance estimation process and the positional relationship estimation process executed by the processing unit 110 of the terminal device 100. The process of FIG. 9 corresponds to the process of S105 of FIG. 4. When the process is started, the terminal device 100 receives the position beacons (the first position beacon and the second position beacon) (S201). The processing unit 110 estimates the first distance L1 based on the received first position beacon and estimates the second distance L2 based on the second position beacon (S202).

Next, the processing unit 110 determines whether at least one of L1 and L2 is equal to or less than a given threshold value (S203). The threshold value here is a threshold value for determining whether or not it is approaching the electronic apparatus 200 to the extent that it can be presumed that the user intends to operate the electronic apparatus 200. Specifically, the threshold value of about several tens of cm to 1 m is set as the threshold value. However, various modification embodiments can be implemented as to specific examples of threshold values.

In a case where both L1 and L2 are larger than the threshold value (No in S203), the terminal device 100 and the electronic apparatus 200 are separated, and the terminal device 100 and the electronic apparatus 200 are not in a given positional relationship. Since it is unlikely that the user intends to operate the electronic apparatus 200, the processing unit 110 returns to S201 and continues the process.

In a case where at least one of L1 and L2 is equal to or less than the threshold value (Yes in S203), the processing unit 110 determines whether the expression of L1<L2 is satisfied (S204). In a case of L1≥L2 (No in S204), the terminal device 100 and the electronic apparatus 200 are not in a given positional relationship, and it cannot be considered that the user intends to operate the electronic apparatus 200. Accordingly, the processing unit 110 returns to S201 and continues the processing.

In a case of L1<L2 (Yes in S204), it is determined that the terminal device 100 and the electronic apparatus 200 are in a given positional relationship (S205). Specifically, in order to proceed to the processing of S106 and the following steps by leaving the loop of S104 and S105 in FIG. 4, the processing unit 110 performs processing of creating an arrival beacon (see FIG. 10) and the like.

As can be seen from FIGS. 4 and 9, in a case where the electronic apparatus 200 and the terminal device 100 are in the given positional relationship based on the beacon signal from the first communication device 221 and the beacon signal from the second communication device 222 (in a case where the process of FIG. 9 determined as Yes in S204), the terminal device 100 transmits the execution instruction information to the electronic apparatus 200 (S106 in FIG. 4).

Here, the execution instruction information is included in the beacon signal transmitted by the terminal device 100. In other words, the terminal device 100 in the system (the communication system 10) transmits the execution instruction information to the electronic apparatus by transmitting the beacon signal including the execution instruction information. Hereinafter, a beacon signal (terminal beacon signal) including execution instruction information is referred to as an arrival beacon.

Figures 10, 11:
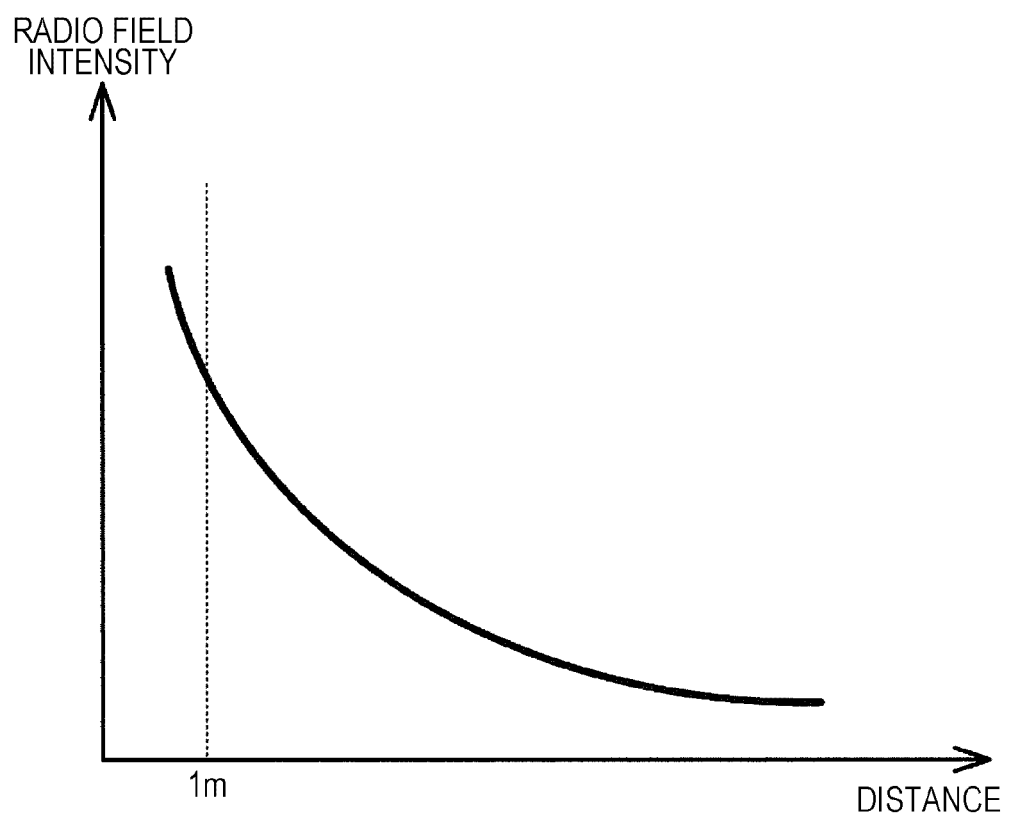
FIG. 10 illustrates an example of a data structure of an arrival beacon.
FIG. 11 illustrates an example of a relationship between a distance and received radio field intensity.

FIG. 10 illustrates an example of a data structure of the arrival beacon. The arrival beacon includes a beacon identifier, identification information of the electronic apparatus 200, and user identification information. Each information item is the same as the position beacon, and the beacon identifier is information for specifying in which application the beacon signal is used. The beacon identifier included in the arrival beacon is information indicating that the beacon signal is an arrival beacon. The identification information of the electronic apparatus 200 is information uniquely specifying the electronic apparatus 200, for example, the MAC address of the electronic apparatus 200. The user identification information is information for uniquely identifying the user.

In a case of receiving the arrival beacon, since the electronic apparatus 200 can determine that the terminal device 100 and the electronic apparatus 200 are in the given positional relationship, and the electronic apparatus 200 starts execution of the job (S107). Since a fact that the beacon signal is the arrival beacon itself serves as a trigger for job execution, at least the beacon identifier is included in the execution instruction information. However, it is not hindered that the arrival beacon includes other types of execution instruction information items. For example, the arrival beacon may include data interpreted as a trigger of job execution in the electronic apparatus 200 and information for specifying a job to be executed as execution instruction information.

However, in order to properly execute the job, there is also a case of a process of specifying which the electronic apparatus 200 the execution instruction information is targeted or a process of specifying which job of the user (job waiting for an authentication) is targeted for execution instruction information is necessary. The identification information of the electronic apparatus and the user identification information are used for these specific processes. Details will be described later together with the authentication job (authenticated printing).

As described above, by using the beacon signal (in particular, an advertisement packet conforming to the BLE standard) for transmission of execution instruction information, there is an advantage that transmission and reception of execution instruction information can be realized by using the same configuration (BLE chip) as that of position beacon transmission and reception.

However, the execution instruction information may be transmitted in a form other than the BLE advertisement packet. For example, the BLE communication may be established (pairing and bonding executed) between the terminal device 100 and the electronic apparatus 200 and the execution instruction information may be transmitted using the established BLE communication.

Alternatively, the execution instruction information may be transmitted using a communication standard other than BLE. A communication standard other than BLE is, for example, a communication standard conforming to the Wi-Fi standard. The wireless communication using the Wi-Fi standard may be communication via an external access point (wireless LAN router or the like), for example. Alternatively, a Wi-Fi Direct (WFD) method in which one of the terminal device 100 and the electronic apparatus 200 activates an internal access point (software access point) and the other device connects to the internal access point May be used.

In communication conforming to the Wi-Fi standard, it is assumed that execution instruction information is transmitted using the established communication after the connection is established, that is, after the connection using the SSID and a password is executed to the access point. However, modification embodiments such as including execution instruction information in a beacon signal (for example, SSID broadcast) of the Wi-Fi standard are also possible.

2.4 Determination of Distance

Next, the distance determination process based on the beacon signal will be described. As illustrated in FIG. 6, the beacon signal (the position beacon, more specifically, the advertisement packet) transmitted from the electronic apparatus 200 includes the information of the radio field intensity (signal strength value) which is the reference of the distance. In addition, the terminal device 100 can acquire the actual received radio field intensity (received signal strength indication) at the time of receiving the beacon signal.

The processing unit 110 compares the received signal strength indication with the signal intensity value serving as a reference of the distance included in the beacon signal. The signal intensity value serving as the reference of the distance is, a received signal strength indication (RSSI) of the beacon signal in the receiving side apparatus when the receiving side apparatus is installed at a position apart from the transmitting side apparatus of the beacon signal by a reference distance. In the example of using the BLE standard beacon signal (advertise packet), the transmitting side apparatus is a broadcaster and the receiving side apparatus is an observer. The reference distance is, for example, 1 m. However, it may be set to a different distance.

FIG. 11 illustrates an example of the relationship between the distance from the device that transmitted the beacon signal and the radio field intensity of the beacon signal received at each distance. Generally, it is known that the radio field intensity becomes weak in inverse proportion to the square of the distance. Therefore, if the radio field intensity (the above-mentioned signal strength value) at the reference distance is known, the distance between the terminal device 100 and the electronic apparatus 200 can be calculated based on the radio field intensity of the actually received beacon signal. The processing unit 110 stores the relational expression corresponding to FIG. 11 in the storage unit 160, and calculates the distance by substituting the received signal strength indication actually measured into the expression. Alternatively, the processing unit 110 may store the relationship illustrated in FIG. 11 is stored as a table (look-up table) in the storage unit 160, and obtain the distance by extracting the appropriate data from the table based on the signal strength value serving as a reference and the received signal strength indication actually measured.

As illustrated in FIG. 9, the terminal device 100 determines whether at least one of the first distance L1 and the second distance L2 is equal to or less than a threshold value (S203) and whether the expression of L1<L2 is satisfied (S204). As described above, if the method of directly obtaining the first distance L1 and the second distance L2 is realized, the process of S203 is realized by comparing the obtained L1 and L2 with the threshold value, and by the mutual comparison between L1 and L2, the process of S204 is realized. However, at least one of S203 and S204 may be realized without directly obtaining the distance.

For example, the reference distance of the signal intensity value included in the beacon signal is set to coincide with the threshold value of the distance used in S203. For example, if the threshold value used in the determination in S203 is "1 m", the received signal strength indication when the observer is disposed in a position 1 m away from the broadcaster is included in the beacon signal (position beacon). In this case, the processing unit 110 compares the signal strength value with the received signal strength indication of the beacon signal. If the received signal strength indication is equal to or larger than the reference signal strength value, the distance between the terminal device 100 and the electronic apparatus 200 is equal to or less than the given threshold value, and if the received signal strength indication is smaller than the reference signal strength value, it can be determined that the distance between the terminal device 100 and the electronic apparatus 200 is larger than a given threshold value. The processing unit 110 may perform a comparison process of the radio field intensity and since it is not necessary to directly calculate the distance itself, the processing load can be reduced.

In addition, in a case where the predetermined condition is satisfied, the determination in S204 of FIG. 9 can also be realized by comparing the received radio field intensity. For example, a case where the first received radio field intensity at a position distant from the first communication device 221 by a predetermined distance and the second received radio field intensity at a position separated by the predetermined distance from the second communication device 222 become equal can be considered. In this case, if the first received radio field intensity is stronger than the second received radio field intensity, it can be determined that the expression of L1<L2 is satisfied, and if the first received radio field intensity is lower than or equal to the second received radio field intensity, it can be determined that the expression of L1≥L2 is satisfied. Alternatively, correction parameters that equalize the first received radio field intensity and the second received radio field intensity is acquired in advance, and the determination of S204 may be realized by comparing the corrected first received radio field intensity and the second received radio field intensity. That is, the determination of the distance in the present embodiment includes a case where determination is performed by actually obtaining the distance using a mathematical formula or a table, and also including a case where determination is made based on the comparison process of the radio field intensity.

2.5 Authentication Job (Authenticated Printing)

Next, the authentication job will be described. Here, the authentication job represents a job requiring an authentication process related to a user when executing the job in the electronic apparatus 200. In the following, an example will be described in which the electronic apparatus 200 is a printer and the authentication job is an authenticated printing job. However, the authentication job of the present embodiment can be extended to a job other than printing.

Figure 12:
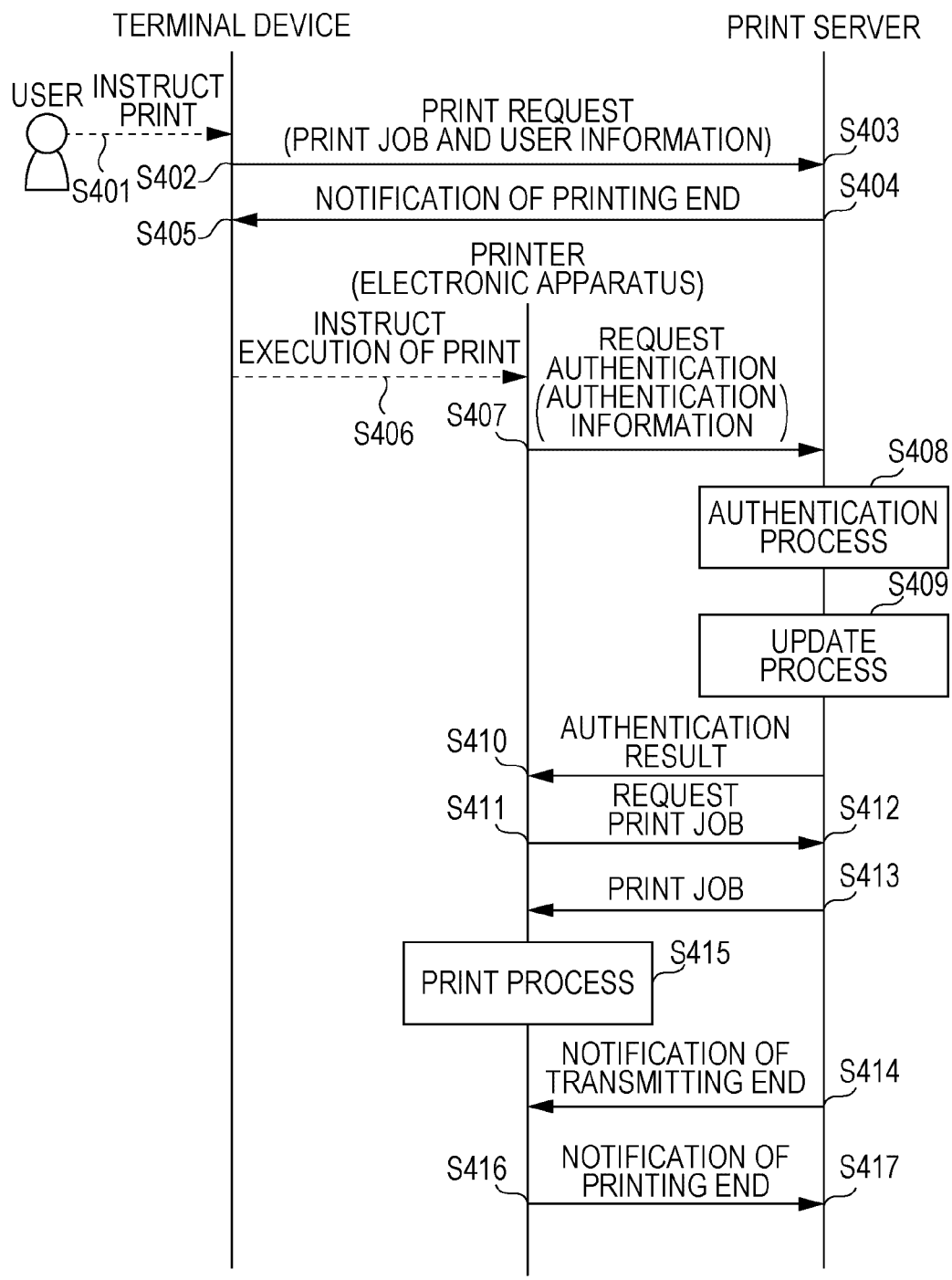
FIG. 12 is a sequence diagram illustrating an authentication printing process.

FIG. 12 is a diagram for illustrating an operation sequence of a system including a printer (the electronic apparatus 200) in the case of performing the authenticated printing. FIG. 12 illustrates an example of authentication printing processing, and it is possible to perform various modification embodiments such as omission of partial processing in FIG. 12, addition of other processing, change in processing order, and the like.

In FIG. 12, a print server is a server connected to a plurality of printers and controlling the operation of each printer. In the authenticated printing, a print server that is separate from the printer is often provided. However, one or more printers among the plurality of printers may include an internal server, and the internal server may operate as a print server. The terminal device 100, the print server, and the printer are connected via a network such as a LAN. Here, as illustrated in FIG. 4, description will be given assuming that the device requesting printing and the device transmitting execution instruction information are the same terminal device 100, but it is also possible to transmit a print request to the terminal device (for example, a PC or the like) different from the terminal device 100.

First, the terminal device 100 receives a print instruction of a user designating the print server as a transmission destination of the print job (S401). Specifically, the terminal device 100 receives a print instruction from the user via the print setting screen, and acquires print setting, data to be printed, and user information (user identification information). The user information here is, for example, a user ID. The terminal device 100 generates a print job including the print setting acquired in S401 and data to be printed, and transmits a print request including the job and the user information to the print server (S402).

The print server receives a print request from the terminal device 100 (S403), and transmits a print completion notification (a notification that the print job is normally stored in the print server) to the terminal device 100 (S404). The terminal device 100 receives a print completion notification (S405).

The printer (the processing unit 210 of the electronic apparatus 200 and the print control unit) receives a print execution instruction (S406). In the case of general authenticated printing, the process of S406 is realized by an operation of inputting authentication information by the user or an operation of causing the card reader to read the authentication card. However, in the present embodiment, the process of S406 is performed by the terminal device 100 by transmitting the execution instruction information (arrival beacon) from the terminal device 100. The printer transmits an authentication request including the authentication information of the user who issued the print instruction in S406 to the print server (S407).

The print server executes the authentication process (S408). Specifically, the print server acquires authentication information included in the authentication request transmitted from the printer. The authentication is performed by comparing the acquired authentication information (user ID and password) with the previously stored authentication information. The authentication result (success or failure) is transmitted to the printer. Note that the print server may perform authentication in cooperation with another authentication server connected via a network.

The print server updates the user information for the user who succeeds in the authentication in S408 (S409). For example, in a case where the authentication of a registered user succeeds, an authentication valid date is updated, and in a case where the target user is not registered, new registration of the user is performed.

The printer receives the authentication result from the print server (S410). In a case where the authentication of the user who issued the print instruction in S406 is successful, the printer transmits a print job request for acquiring the print job of the user to the print server (S411). In a case where the authentication fails, the printer displays, for example, information indicating that authentication is failed, and information indicating that authentication information needs to be entered again.

The print server receives the print job request from the printer (S412), acquires the print job indicated by the print job request from the spool destination, and transmits the print job to the printer (S413). When transmitting of the print job is ended, the print server transmits a transmission completion notification to the printer (S414).

The printer receives the print job from the print server and executes printing of the print data generated based on the print job (S415). In a case where the printing process is completed, the printer transmits a print completion notice to the print server (S416). The print server receives the print completion notice, and ends the process related to the print job requested in S411 (S417).

By performing the process illustrated in FIG. 12, reception of execution instruction information from the terminal device 100 (S406) is requested in the printing process (S415) by the printer. Therefore, in a case where the user approaches the rear side of the electronic apparatus 200, that is, in a case where the probability of collecting the printed materials is low, the authenticated printing is not executed. Accordingly, it is possible to suppress the remaining or removing of the printed matters, and to enhance the security. At that time, since it is unnecessary to input authentication information or the like using the operation unit 240, convenience for the user can be improved.

As described above, the electronic apparatus 200 (printer) performs an authentication request based on the execution instruction information from the terminal device 100 (S407). At this time, in the electronic apparatus 200, it is necessary to specify the user who is the target of the authentication request. In a case where the user can not be identified, there is a possibility that a user different from the user of the terminal device 100 that transmits the execution instruction information is a target to the authentication request, and the effect of improving the security by the authentication printing is impaired.

Therefore, as illustrated in FIG. 10, the terminal device 100 in the system transmits a terminal beacon signal including user identification information for identifying the user of the terminal device 100 and execution instruction information. When the first communication device 221 or the second communication device 222 receives the terminal beacon signal, the processing unit 210 of the electronic apparatus 200 determines whether the setting for performing the authentication process in execution of the job is valid, and in a case where the setting is valid, the processing unit 210 of the electronic apparatus 200 executes the job waiting for an authentication of the user identified by the user identification information included in the terminal beacon signal according to the job execution instruction.

In this manner, it is possible to execute the authentication request (authentication process) targeting an appropriate user and appropriately execute the job waiting for an authentication in a case where there is a job waiting for an authentication by the target user.

In addition, the authenticated printing assumes a situation in which a large number of users use the same printer, that is, a situation in which a business printer is used in an office or the like. In such a situation, there are many cases where a plurality of printers are present in a range close to a certain extent (for example, on the same floor in the office) in many cases, and execution instruction information transmitted by assuming a given printer as the terminal device 100 is stored in another printer. In particular, in a case where the execution instruction information is included in the beacon signal, since the beacon signal is broadcast without specifying the receiving device, the information can be received by other printers.

In a case where a given user is requesting the authenticated printing to a plurality of printers, by receiving the execution instruction information by a plurality of printers, there is a possibility that the authenticated printing may be erroneously executed by an unexpected printer (printer that the user is not moved to near the front).

Therefore, as illustrated in FIG. 10, the terminal device 100 in the system transmits a terminal beacon signal including the identification information of the electronic apparatus 200, the user identification information for identifying the user, and the execution instruction information. When the first communication device 221 or the second communication device 222 receives the terminal beacon signal, the processing unit 210 of the electronic apparatus 200 determines that the identification information of the electronic apparatus 200 included in the terminal beacon signal matches its own identification information, and in the case where it is determined that the identification information matches, the job waiting for an authentication of the user identified by the user identification information included in the terminal beacon signal is executed according to the job execution instruction.

In this manner, by including the identification information of the electronic apparatus 200 in the terminal beacon signal including the execution instruction information, in the electronic apparatus 200 that received the execution instruction information, it can be determined whether the execution instruction information designates itself. In this manner, it is possible to execute the job waiting for an authentication by the appropriate electronic apparatus 200 and the erroneous execution of the job waiting for an authentication by the inappropriate electronic apparatus 200 (the electronic apparatus 200 whose user is not positioned in front), and it is possible to improve the security.

3. Modified Example

Several modification examples will be described below.
3.1 Process Using User Identification Information of Position Beacon In the processing described above with reference to FIG. 9, the processing unit 110 of the terminal device 100 unconditionally starts the estimation processing of L1 and L2 (S202) in a case where the beacon signal is received. However, in a case where the job waiting for an authentication is executed in the electronic apparatus 200, the electronic apparatus 200 can specify which user the job waiting for an authentication of the user was input. In the electronic apparatus 200, it is desired to know whether the user who inputs the job waiting for an authentication (the terminal device 100 of the user) is positioned in the vicinity of the front, and the position of other users is information with low importance.

Therefore, the user is designated on the side of the electronic apparatus 200, and on the side of the terminal device 100, the process is executed on condition that the user of the terminal device 100 is the designated user. When considering from the terminal device 100 side, in a case where the user of the terminal device 100 is not the designated user, since the process of estimating the distance and the positional relationship can be omitted, the processing load can be reduced. In addition, when considering from the electronic apparatus 200 side, since it is possible to suppress transmission of an arrival beacon from the terminal device 100 that does not have the job waiting for an authentication, it is possible to suppress the probability of receiving information with low importance.

Specifically, as described above with reference to FIG. 6, the processing unit 210 causes the first communication device 221 to transmit the first beacon signal including the user identification information for identifying the user having the job waiting for an authentication, and causes the second communication device 222 to transmit the second beacon signal including the user identification information for identifying the user having the job waiting for an authentication. When receiving the first beacon signal and the second beacon signal, the terminal device 100 determines whether the user identification information matching the user identification information for identifying the user of the terminal device 100 is in the first beacon signal and the second beacon signal, in a case where it is determined that the user identification information is included in the first beacon signal and the second beacon signal, the terminal device 100 determines whether the electronic apparatus 200 and the terminal device 100 are in the given positional relationship, and in a case where it is determined that the electronic apparatus 200 and the terminal device 100 are in the given positional relationship, the terminal device 100 transmits the execution instruction information of the job to the electronic apparatus 200. That is, the terminal device 100 determines whether its user matches the user specified by the user identification information, and executes the processes in and after S202 on the matching condition.

Figure 13:
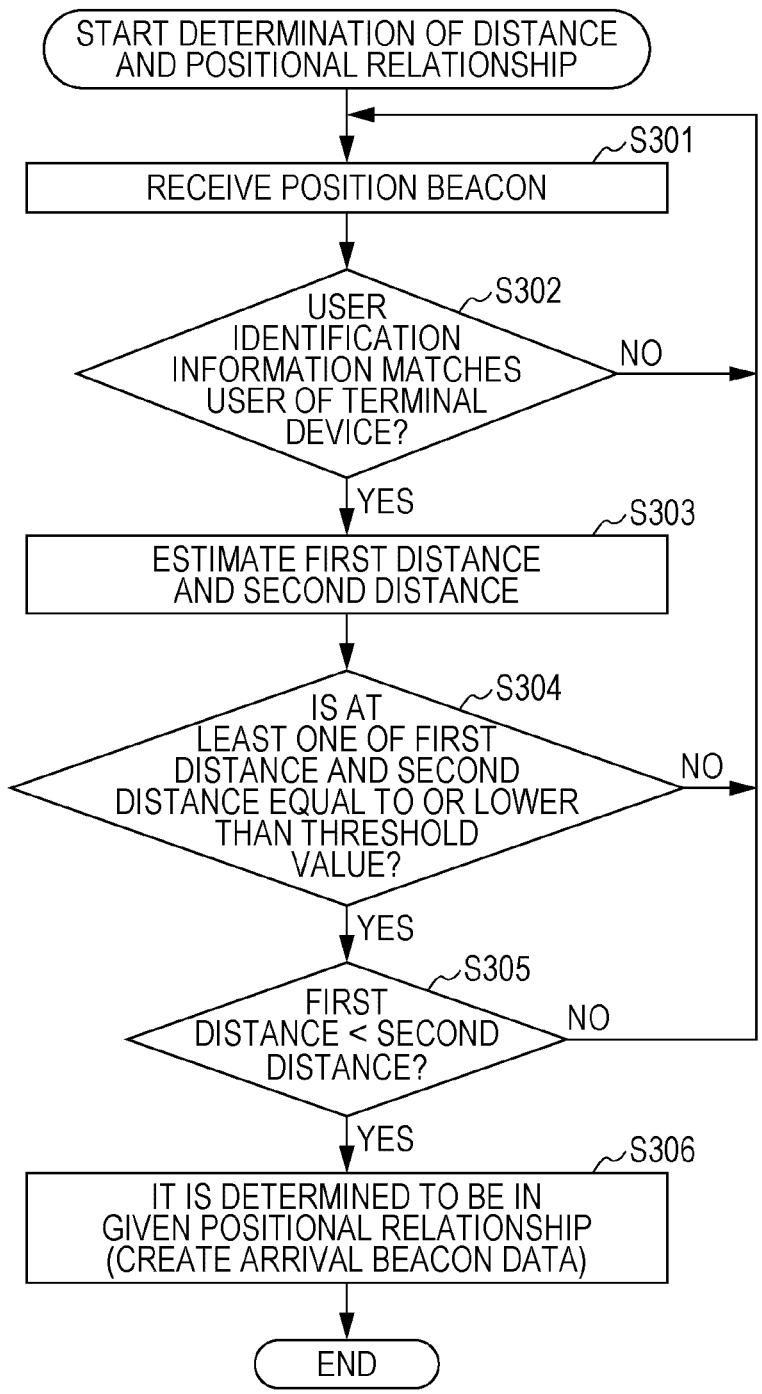
FIG. 13 is another flowchart for illustrating the processes of the terminal device in the present embodiment.

FIG. 13 is another flowchart for illustrating the distance estimation processing and the positional relationship estimation processing executed by the processing unit 110 of the terminal device 100. The reception of the position beacon (S301) is the same as S201 of FIG. 9. The processing unit 110 determines whether the user identification information included in the received position beacon matches with its own user (S302).

In a case where it is determined that user identification information matches with its own user (Yes in S302), the subsequent process from S303 is executed. The processes of S303 to S306 are the same as the processes of S202 to S205 of FIG. 9. On the other hand, it is determined that user identification information does not match with its own user (No in S302), the subsequent process from S303 is skipped and the process returns to S301.

The electronic apparatus 200 receives the beacon signal (arrival beacon) including the identification information and the user identification information of the electronic apparatus 200 as execution instruction information from the terminal device 100 corresponding to the user identification information of the position beacon, and in a case where the identification information of the electronic apparatus 200 matches the own identification information, the electronic apparatus 200 executes the job waiting for an authentication of the user specified by the user identification information of the arrival beacon.
3.2 Modification Example Relating Configuration of Wireless Communication Device In the above description, the example in which the electronic apparatus 200 includes a plurality of communication devices with different disposing positions are described. However, the determination of the positional relationship (front and back) is only required to output the position beacons from different positions, and is not limited to the device provided with a plurality of fixed communication devices.

The electronic apparatus 200 is an electronic apparatus in a system (communication system 10) including the terminal device 100 and the electronic apparatus 200, and includes a communication device (communication chip) that is capable of wireless communication with the terminal device 100, a position changing mechanism that changes the position of the communication device, and the processing unit 210 that performs the control of the communication device. In a case where the communication device is set to the first position of the electronic apparatus 200 by the position changing mechanism, the processing unit 210 causes the communication device to transmit the beacon signal including the first position specifying information for specifying the first position, and in a case where the communication device is set to the second position different from the first position of the electronic apparatus 200 by the position changing mechanism, causes the communication device to transmit the beacon signal including the second position specifying information for specifying the second position.

The position changing mechanism here can be realized by various configurations. For example, the position changing mechanism is a guide (linear guide, rail, or the like), and a driving mechanism (motor) for moving the communication device along the guide. The given position on the guide (for example, the first direction end portion) is the first position and the other position (for example, the second direction end portion opposite to the first direction) is the second position. The position changing mechanism sets the communication device to the second position by moving the communication device in the first position in the second direction using the driving mechanism. In addition, the position changing mechanism also sets the communication device to the first position by moving the communication device in the second position in the first direction using the driving mechanism.

FIG. 14 is a schematic diagram for illustrating the method of the present modification example. In FIG. 14, a horizontal axis represents time and a vertical axis represents the position of the communication device on the movement axis (guide direction). In the example of FIG. 14, the position changing mechanism stops the communication device at the first position for a predetermined time, then moves the communication device to the second position at a predetermined speed, and stops the communication device at the second position for a predetermined time. After the lapse of the predetermined time, the position changing mechanism moves the communication device to the first position at the predetermined speed, stops the communication device at the first position for a predetermined time, and then moves the communication device to the second position at the predetermined speed. Hereinafter, the position changing mechanism repeats the same operation.

The communication device transmits the first position beacon at the timing of stopping at the first position (for example, t1, t3, t5, . . . ) and transmits the second position beacon at the timing of stopping at the second position (for example, t2, t4, t6, . . . ). For example, the processing unit 210 acquires information specifying the position of the communication device from the position changing mechanism (an encoder outputting the driving amount of the motor), and instructs the communication device to output the first position beacon (second position beacon) at the timing when it is determined that the communication device is in the first position (second position).

In the terminal device 100, for example, the first position beacon transmitted at t1 is received to estimate L1, the second position beacon transmitted at t2 is received, and L2 is estimated. That is, the processing unit 110 of the terminal device 100 performs distance estimation processing from position beacons received at two different timings. The estimation process in the terminal device 100 may be executed once for the transmission of the position beacon twice, such as the first estimation at the position beacon of t1 and t2, and the second estimation at the position beacon at t3 and t4. Alternatively, the estimation process in the terminal device 100 may be executed once for transmission of one position beacon, such as the first estimation at the position beacon of t1 and t2, and the second estimation at the position beacon at t2 and t3. In addition, the driving method of the communication device by the position changing mechanism, the transmission timing of the position beacon from the communication device, and the like are not limited to those in FIG. 14, and various modification examples can be implemented.

In addition, the reason why it is necessary to transmit the position beacons from two or more different positions is that there is no directivity in the beacon signal. As illustrated in FIG. 7 or 8, the point that is away from the first position by L1 is one of the points on the circumference (on the spherical surface in the case of three dimensions), and the point can be specified as one point. Therefore, in the distance from one position, the positional relationship between the terminal device 100 and the electronic apparatus 200 cannot be specified, and in the method described above, the position beacon is transmitted from two or more positions. However, if it is possible to apply directionality to the beacon signal, it is possible to specify the positional relationship, that is, whether the terminal device 100 is positioned on the front side of the electronic apparatus 200 by using one beacon signal.

The electronic apparatus 200 of the present modification example is an electronic apparatus in a system (communication system 10) including the terminal device 100 and the electronic apparatus 200, and includes a communication device that is capable of wireless communication with the terminal device 100, the processing unit 210 for executing job execution processing, and a directional member having an opening at a front side which is an operation interface unit side of the electronic apparatus 200 and directing a beacon signal output from the communication device to the front side. When receiving the beacon signal from the communication device, the terminal device 100 obtains the distance between the terminal device 100 and the electronic apparatus 200 based on the radio field intensity of the beacon signal, and in a case where the obtained distance is equal to or less than the threshold value, the terminal device 100 transmits the execution instruction information of the job to the electronic apparatus 200. The processing unit 210 of the electronic apparatus 200 executes the job in a case of receiving the execution instruction information of the job transmitted from the terminal device 100.

The directional member of the present modification example includes, for example, a member for shielding the beacon signal in the backward direction and a member for shielding the beacon signal in the side direction. The directional member may include a member for shielding the beacon signal in the vertical direction (gravity direction and the opposite direction). On the other hand, the directional member includes an opening in the front direction so as not to block the beacon signal in the front direction. The directional member may be an integral member (for example, a substantially rectangular parallelepiped member having an opening in the front direction), or may be a member divided into a plurality of members (for example, five sheets of plate-like members corresponding to the back surface, the upper surface, the lower surface, and the two side surfaces). In addition, since the directional member needs to shield the propagation of the beacon signal, the directional member is formed of metal, for example.

In this manner, the beacon signal from the communication device has the directivity in the front direction. Therefore, the terminal device 100 positioned on the front side of the electronic apparatus 200 can receive the beacon signal. However, the terminal device 100 positioned on the rear side of the electronic apparatus 200 cannot receive the beacon signal. Therefore, in a case where the beacon signal can be received and the distance to the electronic apparatus 200 (communication device) is equal to or less than the predetermined threshold value, it can be determined that the terminal device 100 is in the given positional relationship with the electronic apparatus 200.

3.3 Modification Example of Job

In addition, in the above description, the example in which the job executed based on the execution instruction information from the terminal device 100 is a job accompanied by the authentication process is described. However, the job can be extended to other jobs.

As described above, when the terminal device 100 and the electronic apparatus 200 are in the given positional relationship, the probability that the electronic apparatus 200 is operated by the user is high. A state in which the function of the electronic apparatus 200 such as a print function or the like is normally used (hereinafter, referred to as a normal operation state) and a power saving state in which the power consumption is small compared to the normal operation state are set in advance. In a case where the execution instruction information is transmitted from the terminal device 100, the electronic apparatus 200 executes control to return from the power saving state to the normal operation state as a job. In a case where three or more stages of states are set and the execution instruction information is transmitted, control may be executed as a job of returning from a first power saving state in which the power consumption is relatively small to a second power saving state in which the power consumption is relatively large.

Since the recent demands for power saving in the electronic apparatus 200 are increasing, many functions are stopped (for example, the main CPU is stopped) in the power saving state, and in order to return to the normal operation state, it takes time to return to the normal operation state. In this point, according to the method of the present modification examples, since the fact that the terminal device 100 and the electronic apparatus 200 are in the given positional relationship as triggers without waiting for the actual operation by the user, it is possible to return to the state quickly. Since execution instruction information is used at that time, returning to the normal operation state is executed in a case where the possibility that the electronic apparatus 200 is operated by the user is high. In other words, it is possible to suppress returning to the normal operation state at an unnecessary case.

Alternatively, in a case where the execution instruction information (arrival beacon) is received, control for displaying a screen display peculiar to the user based on the user identification information included in the arrival beacon may be executed as the job. By displaying the screen estimated to be used by the user in advance, user convenience can be improved.

At this time, the electronic apparatus 200 may use the information on the job waiting for an authentication, usage history information of the user, type information of the user, or the like to determine the display screen. Since there may be a plurality of jobs for waiting an authentication (in a narrow definition, authenticated printing), an appropriate job can be executed by displaying a selection screen on which to execute. Alternatively, by displaying a screen corresponding to the function frequently used by the user, it becomes unnecessary for the user to execute an operation for screen transition, thereby improving convenience. In addition, since the probability that the user in charge of maintenance is likely to use the dedicated maintenance screen is high, in a case where the user type is the user in charge of maintenance (serviceman), display processing of the exclusive screen is performed.

In this manner, it is possible to dynamically determine the display screen peculiar to the user. Therefore, flexible display control according to the situation of the terminal device 100 (situation of the user) can be realized.

In the power saving control or the screen display control, it is unlikely that the job is input (requested) in advance from the terminal device 100 to the electronic apparatus 200 as in S101 in FIG. 4. That is, there is no clear trigger of the start of the transmission of the position beacon in the electronic apparatus 200 (S102) and the start of the distance and positional relationship estimation processing (S103) in the terminal device 100. Therefore, in the modification example, for example, the electronic apparatus 200 periodically transmits (constantly) the position beacon, and the terminal device 100 periodically (constantly) estimates the distance and the positional relationship.

3.4 System and Program

In addition, as illustrated in FIG. 1, the method of the present embodiment can be applied to the communication system 10 including the electronic apparatus 200 and the terminal device 100.

In addition, a part or most of the process of the terminal device 100 and the electronic apparatus 200 of the present embodiment may be realized by a program. In this case, the terminal device 100 or the like of the present embodiment is realized by the processor such as the CPU executing the program. Specifically, the program stored in the non-transitory information storage medium is read, and the read program is executed by a processor such as a CPU. Here, the information storage medium (computer readable medium) stores programs, data, and the like, and the function can be realized by an optical disk (DVD, CD, or the like), HDD (hard disk drive), memory (card type memory, ROM, or the like), or the like. A processor such as a CPU performs various processes according to the present embodiment based on a program (data) stored in the information storage medium. That is, the information storage medium stores a program (a program for causing a computer to execute processing of each unit) for causing a computer (a device including an operation unit, a processing unit, a storage unit, and an output unit) to function as each unit of the present embodiment.

The embodiments in which the invention is applied and the modification examples thereof have been described above. Note that the invention is not limited to the embodiments or the modification examples thereof. Various modification examples and variations may be made of the embodiments without departing from the scope of the invention. A plurality of elements described in connection with the embodiments and the modification examples thereof may be appropriately combined to implement various configurations. For example, an arbitrary element may be omitted from the elements described above in connection with the embodiments and the modification examples thereof. Some of the elements described above in connection with different embodiments or modification examples may be appropriately combined. Any term cited with a different term having a broader meaning or the same meaning at least once in the specification and the drawings can be replaced by the different term in any place in the specification and the drawings. In this manner, various modification examples and applications are possible without materially departing from the novel teachings and advantages of the invention.

The entire disclosure of Japanese Patent Application No. 2017-204896, filed Oct. 24, 2017 is expressly incorporated by reference herein.

What is claimed is:

1. An electronic apparatus in a system including a terminal device and an electronic apparatus, the apparatus comprising:
   a first communication device that is disposed in a first position of the electronic apparatus and capable of wireless communication with the terminal device;
   a second communication device that is disposed in a second position different from the first position of the electronic apparatus and capable of wireless communication with the terminal device; and
   a processing unit that controls the first communication device and the second communication device,
   wherein the processing unit causes the first communication device to transmit a first beacon signal including first position specifying information for the terminal device to specify the first position, and causes the second communication device to transmit a second beacon signal including second position specifying information for the terminal device to specify the second position, and wherein the first beacon signal transmitted by the first communication device and the second beacon signal transmitted by the second communication device include identification information of the electronic apparatus.

2. The electronic apparatus according to claim 1, wherein the terminal device in the system determines whether the electronic apparatus and the terminal device are in a given positional relationship based on the first position specifying information included in the first beacon signal received from the first communication device and the second position specifying information included in the second beacon signal received from the second communication device, and in a case where it is determined that the electronic apparatus and the terminal device are in the given positional relationship, transmits execution instruction information of a job to the electronic apparatus.

3. The electronic apparatus according to claim 2, further comprising:

an operation interface unit, wherein the given positional relationship indicates a positional relationship in which a distance between the terminal device and the electronic apparatus is less than a threshold value on a front side of the electronic apparatus on which the operation interface unit is provided.

4. The electronic apparatus according to claim 3, wherein the first communication device is disposed at a location in a first positional relationship with respect to the operation interface unit, and the second communication device is disposed at a location in a second positional relationship different from the first positional relationship with respect to the operation interface unit.

5. The electronic apparatus according to claim 4, wherein the first communication device is disposed at a front side of the electronic apparatus which is the operation interface unit side and the second communication device is disposed at a rear side of the electronic apparatus.

6. The electronic apparatus according to claim 2, wherein the terminal device in the system transmits the execution instruction information to the electronic apparatus by transmitting a beacon signal including the execution instruction information.

7. The electronic apparatus according to claim 6, wherein the terminal device in the system transmits a terminal beacon signal including user identification information for identifying a user of the terminal device and the execution instruction information, and wherein when the first communication device or the second communication device receives the terminal beacon signal, the processing unit determines whether a setting for performing an authentication process in an execution of a job is valid, and in a case where it is determined that the setting is valid, executes a job waiting for authentication of the user identified by the user identification information included in the terminal beacon signal according to an execution instruction of the job.

8. The electronic apparatus according to claim 6, wherein the terminal device in the system transmits a terminal beacon signal including identification information of the electronic apparatus, user identification information for identifying the user, and the execution instruction information, and wherein when the first communication device or the second communication device receives the terminal beacon signal, the processing unit determines whether the identification information of the electronic apparatus included in the terminal beacon signal matches the own identification information, and in a case where it is determined that the identification information matches the own identification information, executes a job waiting for authentication of the user identified by the user identification information included in the terminal beacon signal according to the execution instruction of the job.

9. The electronic apparatus according to claim 2, wherein the processing unit causes the first communication device to transmit the first beacon signal including user identification information for identifying a user having a job waiting for authentication, and causes the second communication device to transmit the second beacon signal including the user identification information for identifying the user having the job waiting for authentication, and wherein when the first beacon signal and the second beacon signal are received, the terminal device determines whether user identification information matching the user identification information for identifying the user of the terminal device is included in the first beacon signal and the second beacon signal, and in a case where it is determined that the user identification information is included in the first beacon signal and the second beacon signal, determines whether the electronic apparatus and the terminal device are in a given positional relationship, and in a case where it is determined that the electronic apparatus and the terminal device are in a given positional relationship, transmits the execution instruction information of the job to the electronic apparatus.

* * * * *